(12) United States Patent
Turner et al.

(10) Patent No.: US 12,410,873 B2
(45) Date of Patent: Sep. 9, 2025

(54) APPARATUS, SYSTEM, AND METHOD FOR A TUBULAR BODY TO TRAVERSE A GAP

(71) Applicant: TRAXyL Inc., Gainesville, VA (US)

(72) Inventors: Daniel R. Turner, Gainesville, VA (US); Phillip Turner, Gainesville, VA (US)

(73) Assignee: TRAXyL, Inc., Gainesville, VA (US)

( * ) Notice: Subject to any disclaimer, the term of this patent is extended or adjusted under 35 U.S.C. 154(b) by 140 days.

(21) Appl. No.: 18/354,514

(22) Filed: Jul. 18, 2023

(65) Prior Publication Data
US 2024/0026995 A1    Jan. 25, 2024

Related U.S. Application Data

(60) Provisional application No. 63/410,407, filed on Sep. 27, 2022, provisional application No. 63/390,341, filed on Jul. 19, 2022.

(51) Int. Cl.
| | |
|---|---|
| *F16L 1/11* | (2006.01) |
| *F16L 3/18* | (2006.01) |
| *H02G 9/02* | (2006.01) |

(52) U.S. Cl.
CPC . *F16L 1/11* (2013.01); *F16L 3/18* (2013.01); *H02G 9/025* (2013.01)

(58) Field of Classification Search
CPC .. E01C 11/02; E01C 11/14; F16L 1/10; F16L 1/11; F16L 1/024; F16L 1/0243; F16L 3/18; H02G 9/02; H02G 9/025; H02G 9/04
(Continued)

(56) References Cited

U.S. PATENT DOCUMENTS

| | | | | |
|---|---|---|---|---|
| 3,331,171 A | * | 7/1967 | Hallock | E04B 1/68 |
| | | | | 52/396.04 |
| 3,473,339 A | * | 10/1969 | Schlafly, Jr. | H02G 9/065 |
| | | | | 174/37 |

(Continued)

FOREIGN PATENT DOCUMENTS

| | | | |
|---|---|---|---|
| CN | 106025988 A | * | 10/2016 |
| CN | 108565814 A | * | 9/2018 |

(Continued)

OTHER PUBLICATIONS

Builderspace.com [online], "This Is How Bridges Expand and Contract," Oct. 2, 2021, retrieved on May 7, 2025, retrieved from URL <https://www.builderspace.com/this-is-how-bridges-expand-and-contract>, 13 pages.

(Continued)

*Primary Examiner* — Frederick L Lagman
(74) *Attorney, Agent, or Firm* — Fish & Richardson P.C.

(57) ABSTRACT

An apparatus, system, and method for deploying a tubular body across a gap. The tubular body is fixed to a surface on either side of the gap. The system includes a first connector housing fixed to the first surface and a second connector housing fixed to a second surface. An insertion end of the first connector housing is smaller than a receiving end of the second connector housing such that the insertion end of the first connector is insertable into the receiving end of the second connector housing. The tubular body passes continuously through the interior volume of the first connector housing and through the interior volume of the second connector housing.

17 Claims, 11 Drawing Sheets

(58) Field of Classification Search
USPC .................. 404/57, 58, 60; 405/157, 184.4
See application file for complete search history.

(56) References Cited

U.S. PATENT DOCUMENTS

| | | | |
|---|---|---|---|
| 5,024,554 A | 6/1991 | Benneyworth et al. | |
| 5,160,218 A * | 11/1992 | Hill | F16L 1/24 |
| | | | 405/172 |
| 5,649,784 A | 7/1997 | Ricaud et al. | |
| 7,252,454 B2 | 8/2007 | Bradford et al. | |
| 7,740,417 B2 * | 6/2010 | Jang | E02D 27/46 |
| | | | 405/157 |
| 8,167,250 B2 | 5/2012 | White | |
| 9,588,315 B1 | 3/2017 | Turner | |
| 10,184,243 B2 | 1/2019 | Hamilton et al. | |
| 10,866,380 B2 | 12/2020 | Turner | |
| 2012/0068024 A1 | 3/2012 | Wurzer et al. | |

FOREIGN PATENT DOCUMENTS

| | | | |
|---|---|---|---|
| KR | 100955863 B1 * | 5/2010 | |
| WO | WO 2022/010663 A1 | 1/2022 | |

OTHER PUBLICATIONS

Emseal.com [online], "Sizing Bridge Expansion Joints—Joint Movement in Consideration of Lasting Joint Sealing," May 24, 2022, retrieved on May 7, 2025, retrieved from Internet Archive: Wayback Machine URL <https://web.archive.org/web/20230604045818/https://www.emseal.com/bridge-expansion-joint-division/article/sizing-bridge-expansion-joints-joint-movement-consideration-lasting-joint-sealing/>, 9 pages.

* cited by examiner

APPARATUS, SYSTEM, AND METHOD FOR A TUBULAR BODY TO TRAVERSE A GAP

RELATED APPLICATIONS

This application claims benefit of and priority to U.S. Provisional Application No. 63/390,341 filed Jul. 19, 2022 and U.S. Provisional Application No. 63/410,407 filed Sep. 27, 2022, each of which is incorporated by reference herein in its entirety.

TECHNICAL FIELD

The present disclosure relates to an apparatus, system, and method for deploying at least one tubular body across a gap between two surfaces. For example, the gap may be a crack in a paved surface, such that the method is for traversing the gap between each side of the crack. The tubular body may be a communication line, such as a fiber optic cable, and the surface may be paved, such as a roadway (e.g., a highway) or a parking lot. The gap may be in a bridge, parking garage, tunnel, or any other surface with a joint (including, e.g., a joint or crack in a paved surface).

BACKGROUND DISCUSSION

A plurality of discrete structural members often are disposed end to end to form a surface, such as a bridge, tunnel, or parking garage. The discrete structural members may be, for example, concrete or asphalt slabs. The structural members may be used to form a paved surface (e.g., a roadway, tunnel, or parking garage surface). The discrete structural members may be positioned with a gap between adjacent members. This gap may be called an expansion gap. An expansion gap may be purposefully used between two discrete structural members because it allows expansion or contraction in the adjacent structural members due to changes in weather conditions, load changes (e.g., due to vehicle traffic), and other material deformation that may naturally occur over time without placing undue stress on the structural members.

Expansion gaps are provided between discrete structural members in many different types of bridges, such as suspension bridges, arch bridges, tied arch bridges, cantilevered bridges, beam bridges, truss bridges, and cable bridges. The expansion gap also could be formed between discrete structural members that collectively form other type of pedestrian or vehicular surfaces, such as a parking garage, tunnel, or any other jointed surface. The invention described herein, however, is not limited to any particular type of bridge or any particular type of paved surface.

Expansion joints are often used to span the expansion gap to connect adjacent discrete structural members, such as those forming a bridge. Expansion joints may be designed to allow for vehicle traffic across adjacent structural members, for example, as used in a bridge or parking garage. Expansion joints used to connect discrete structural members are particularly designed to accommodate horizontal and vertical movement between adjacent structural members relative to one another due to, for example, expansion or contraction due to temperature changes or relative movement due to loading changes.

For example, U.S. Pat. Nos. 5,024,554, 5,649,784, 7,252,454, and 10,184,243 generally disclose examples of expansion joints for adjacent structural members. In some cases, expansion joints must be robust to withstand vehicular loading.

Communication lines or communication cables (i.e., examples of tubular bodies) provide useful conduits to transfer information (e.g., audio, visual, etc.) using modern technology. An example of a communication line is a fiber optic cable. The deployment and installation of communication lines, however, can be challenging for several reasons. For example, communication lines may need to extend over relatively long distances to, e.g., provide telecommunications to a commercial or residential building. Additionally, the communication lines may need to be accessible (e.g., for maintenance or repairs). At the same time, however, the communication lines may need to be protected from the environment and are often preferred to be hidden from view.

In general, a typical process for installing a communication cable over a relatively long distance often consists of extruding plastic core tubes around fibers, helically wrapping the tubes around a central strength member, building up several layers of protective sheathing, surrounding the sheathing with a protective material (armor) such as steel, and surrounding the armor with a heavy polymer jacket. Once a cable is manufactured, it can be pulled through conduits, hung along telephone poles, and/or buried inside trenches.

One known method to install cables inside trenches is known as "microtrenching," where a very small trench is cut into, e.g., a paved surface. The cable is then installed within the microtrench, optionally in the layers of protective sheathing as described above. For example, a microtrench may be about 2 to 13 centimeters wide (roughly 0.75 to 5 inches) and between 25 and 60 centimeters deep (roughly 10 to 24 inches), most commonly between one to two feet deep. For example, "microtrench" is defined in Cal. Gov. Code § 65964.5(a)(3) as meaning "a narrow open excavation trench that is less than or equal to 4 inches in width and not less than 12 inches in depth and not more than 26 inches in depth and that is created for the purpose of installing a subsurface pipe or conduit." While a microtrench is not be limited to having particular width and depth dimensions, a person of ordinary skill in the art understands the general distinctions between the characteristics of a microtrench and the dimensions and characteristics of a smoothed segment or other types of trenches known to be formed in paved surfaces.

The microtrenching installation technique is mainly used on roadways and often utilizes a heavy-duty diamond saw blade that cuts a narrow (e.g., only a few inches wide) section of a roadway or similar surface to a predetermined depth depending on the location. A communication cable is installed, or micro duct is inserted for later filling with a communication cable. After that, the microtrench is backfilled with an aggregate and another acceptable material.

In some situations, microtrenching may not be preferred. For example, microtrenching includes risks such as accidentally severing an existing utility line and damaging the integrity of the road surface, which can affect the structural longevity of the road surface that must withstand traffic and other impact forces. Additionally, microtrenching may not be preferred in certain surfaces, such as private roads, shallow road surfaces, bridges, and tunnels.

Therefore, other techniques to deploy tubular bodies (such as fiber optic cable) across paved surfaces are described in U.S. Pat. Nos. 9,588,315 and 10,866,380, each of which are incorporated herein by reference. For example, the technique described in U.S. Pat. No. 10,866,380 generally involves smoothing the top surface of, e.g., a paved structure such as a roadway or parking lot surface and applying a tubular body within the smoothed segment. A protective coating may be applied to the tubular body and/or smoothed segment to adhere the tubular body to the smoothed segment.

When utilizing either a microtrenching technique or the smoothing technique, however, deploying a tubular body across a crack may remain a challenge. For example, the crack may be a naturally formed crack when a paved surface was first created or a naturally formed crack after a duration (e.g., several years) of loading forces and temperature fluctuations applied to the paved surface. As another example, the crack may be formed by an impact load event, such as the sudden application of a particularly large weight on the paved surface. There are numerous other types of cracks and ways that cracks are formed in road surfaces, which would be known to a person of ordinary skill in the art (e.g., fatigue cracking, alligator cracking, block cracking, edge cracking, longitudinal cracking, transverse cracking, reflection cracking, and slippage cracking).

A crack in a paved surface creates a problem for installing a tubular body in a microtrench cut into the paved surface or in a smoothed segment formed on the paved surface because the crack causes the road to separate into two surface that can move with respect to each other, and that movement may put stress/strain on the tubular body, which may eventually cause the tubular body to break. Therefore, there is a need for an installation method, apparatus, and system to facilitate deploying a tubular body across a crack in a paved surface.

Additionally, deploying a communication line or a communication cable across an expansion gap, however, may remain a challenge. As mentioned above, paved surfaces (e.g., bridges or parking garages) are often formed of discrete structural members with expansion gaps between adjacent structural members. Providing a communication line across this expansion gap creates installation challenges because known expansion joints are not conducive for housing or protecting communication lines or cables. Further, there is a need for an efficient installation method to provide a communication line across an expansion gap between discrete structural members. Additionally, there is a need for an apparatus, system, and method for installing a communication line across a large crack in a surface (e.g., separating the surface into two structural members).

SUMMARY

The disclosure here includes a connector apparatus for housing a tubular body traversing a gap. The connector apparatus includes a first connector housing configured to be fixed to a first surface. The first connector housing includes a bottom housing that is rigidly connected to the first surface when the first connector housing is fixed to the first surface. The first connector housing further includes a top housing opposite the bottom housing, an insertion end, and a cable end opposite the insertion end in a horizontal direction. The first connector housing possesses an interior volume defined between the bottom housing, the top housing, the insertion end, and the cable end. The connector apparatus includes a second connector housing is configured to be fixed to a second surface. The second surface is spaced apart from the first surface by a gap. The second connector housing includes a bottom housing that is rigidly connected to the second surface when the second connector housing is fixed to the second surface. The second connector housing further includes a top housing opposite the bottom housing, a receiving end, and a cable end opposite the receiving end in the horizontal direction. The second connector housing possesses an interior volume defined between the bottom housing, the top housing, the receiving end, and the cable end. The insertion end of the first connector housing is smaller than the receiving end of the second connector housing such that the insertion end of the first connector is insertable into the receiving end of the second connector housing. The first connector housing is configured to receive the tubular body to pass through the interior volume of the first connector housing and the second connector housing is configured to receive the tubular body to pass through the interior volume of the second connector housing, such that the tubular body traverses continuously through the first connector housing and the second connector housing when the first and second connector housings are fixed to the first and second surfaces.

Another aspect of the disclosure here involves a method that includes fixing a first connector housing to a first surface. The first connector housing has an open top portion such that an interior of the first connector housing is exposed. The method includes fixing a second connector housing to a second surface. The second connector housing has an open top portion such that an interior of the second connector housing is exposed. The second surface is spaced apart from the first surface in a horizontal direction by a gap. A portion of the second connector housing traverses the gap and extending over the first connector housing. The method further includes applying the tubular body onto the first surface, into the interior of the first connector housing through the open top portion of the first connector housing, into the interior of the second connector housing through the open top portion of the second connector housing, and onto the second surface. The method includes connecting a lid to the second connector housing after the applying of the tubular body to enclose the tubular body in the interior of the second connector housing, and connecting another lid to the first connector housing after the connecting of the lid to the second connector housing to enclose the tubular body in the interior of the first connector housing.

Another aspect of the disclosure here involves a method for deploying a tubular body on a paved surface across a crack in the paved surface. The method includes forming a groove in the paved surface, the groove extending across the crack in the paved surface such that the groove includes a first groove segment on one side of the crack and a second groove segment on an other side of the crack. The method includes attaching a first connector apparatus at the first groove segment and attaching a second connector apparatus at the second groove segment. The second connector apparatus overlaps at least in part the first connector apparatus. At least one of the first connector apparatus and the second connector apparatus extends at least partially across the crack. The method includes deploying the tubular body into the groove such that the tubular body passes continuously in the first groove segment, the first connector apparatus, the second connector apparatus, and the second groove segment. The method includes applying a protective coating onto the tubular body in the groove.

The apparatus, system, and method disclosed here may provide improvements from the known expansion joint techniques discussed above. For example, the disclosed apparatus, system, and method may allow for more efficient installation, an improved protective housing for a tubular body (such as a communication line or fiber optic cable), a simpler and more cost-effective apparatus/system, and/or a robust design that allows a tubular body to traverse a gap, e.g., a joint between adjacent structural members while allowing for vertical and horizontal movement to not compromise the integrity of the tubular body. Additionally, the joint connector apparatus, system, and method disclosed here could be useful to span the gap created by a crack (e.g., a relatively large crack) separating a paved surface into two structural members. A person of ordinary skill in the art would recognize that there are additional benefits provided by the disclosed apparatus, system, and method compared with known techniques.

DETAILED DESCRIPTION

Figure 1:
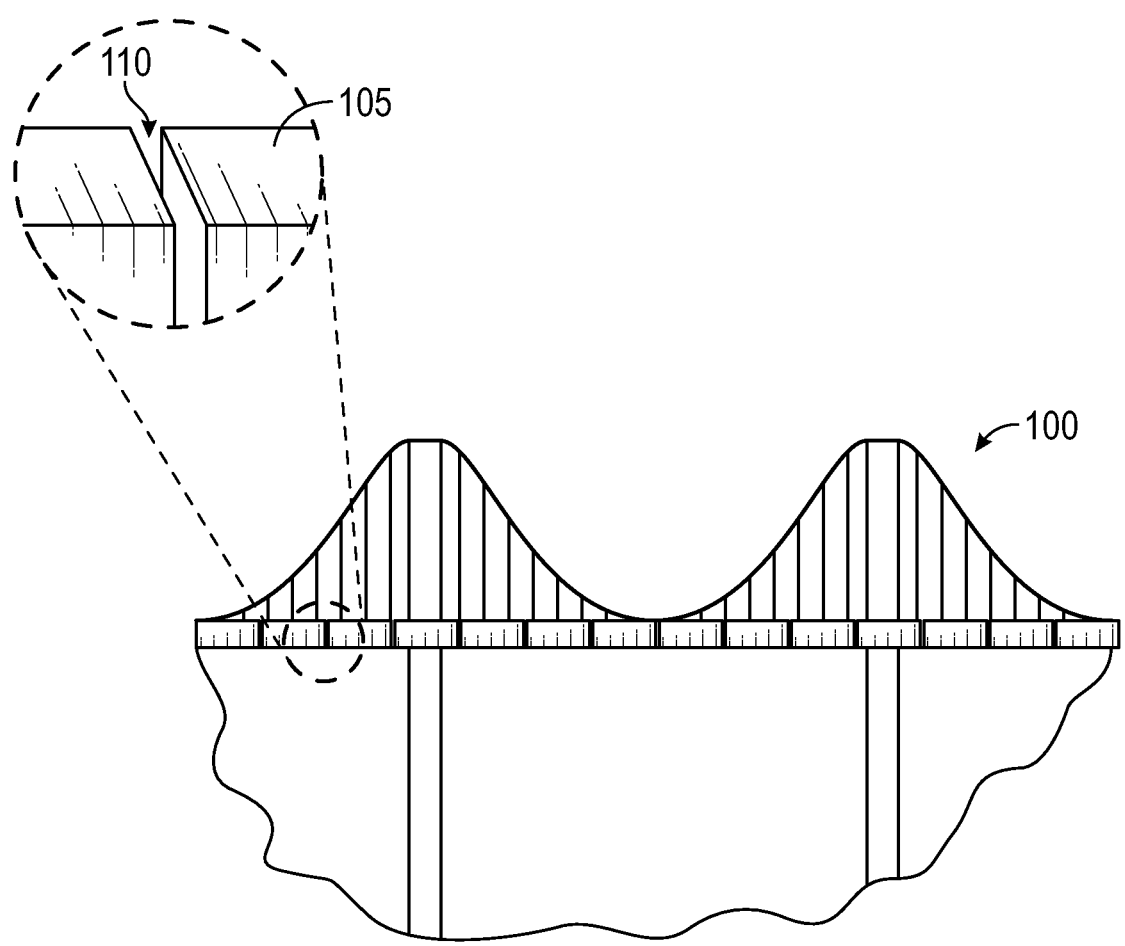
FIG. 1 is a side view of a bridge, with an expansion view of a gap between adjacent structural members.

Hereinafter, embodiments of an apparatus, method, and system for allowing a tubular body to traverse a gap between adjacent structural members representing examples of the inventive apparatus, method, and system are described with reference to the accompanying drawing figures. The same reference numerals are given to common members in each drawing.

It is to be understood that the disclosure is not limited in any way to any particular construction, arrangement, materials, and/or composition of the components set forth in the following description. While the discussion below may generally relate to the connector apparatus spanning an expansion gap in a bridge or a crack in a paved surface such as a road, a person of ordinary skill in the art would understand that the disclosed apparatus (sometimes referred to herein interchangeably as a "connector apparatus") could be employed on other types of gaps (e.g., between discrete structural members forming a tunnel or parking garage, or to span a gap created by pothole in a paved surface).

FIG. 1 generally depicts a side view of a bridge 100. The bridge 100 is formed using a plurality of discrete structural members 105. The structural members 105 may be rectangular. The structural members 105 may be paved surfaces and may be formed from concrete and/or asphalt. The structural members 105 may include additives or other materials and may be used for pedestrian pathways or vehicle roadways (e.g., highways, tunnels, parking surfaces, etc.). The structural members 105 may collectively form a bridge as shown in FIG. 1. The type of bridge is not limited in any respect, nor is the disclosed apparatus or system limited to being utilized for a bridge. Further, the disclosed joint connector apparatus can be utilized on a surface (e.g., a road surface) to span the gap created by a crack (e.g., a pothole) in the surface.

As can be seen in the magnification view of FIG. 1, the discrete structural members 105 may be spaced apart from one another by a gap 110. The gap 110 may be an expansion gap between completely separate structural members (e.g., panels or the slabs of a bridge, tunnel, or parking garage), or it may be a crack (e.g., a pothole) in a roadway. The gap 110 may be purposefully provided during the paved surface construction to allow adjacent structural members 105 to expand and contract. For example, the adjacent structural members 105 may expand and contract due to temperature changes. As a particular example, concrete or asphalt may expand when the temperature increases and may contract when the temperature decreases, and so the expansion gap provides some stress/strain relief when the structural members 105 experience such material deformations.

The structural members 105 may also move relative to one another in the vertical direction due to loading forces. The structural members 105 may also move relative to one another in the horizontal direction due to loading forces. For example, vehicle traffic may apply loading forces to the structural members 105 that cause some amount of relative movement in the vertical and/or horizontal directions. This movement may be relatively small compared to the size of each discrete structural member 105, but nonetheless any relative movement (even minor movement) can be disruptive to a tubular body traversing the roadway formed by the structural members 105.

Figure 2:
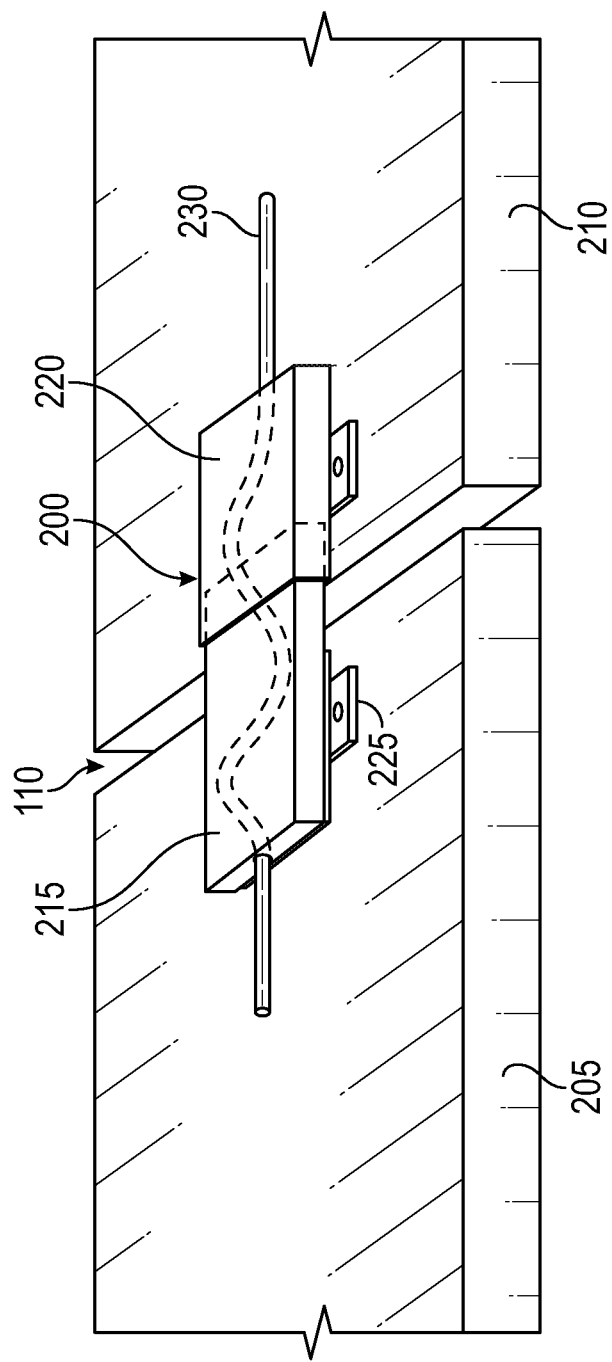
FIG. 2 is a perspective view of an embodiment of the disclosed apparatus spanning a gap between adjacent structural members, with a tubular body passing through the apparatus.

FIG. 2 shows an embodiment of an apparatus 200 that spans the gap 110 between structural members 105. In particular, FIG. 2 two shows that adjacent structural members 105, which are a first structural member 205 and a second structural member 210. The apparatus 200 may be also be referred to as a connector apparatus, connector, gap connector, or joint connector throughout this disclosure because the apparatus 200 spans and connects the gap 110 between adjacent structural members 205, 210. The apparatus 200 includes a first connector housing 215 and a second connector housing 220.

The first connector housing 215 is attached to the first structural member 205, and the second connector housing 220 is attached to the second structural member 210. The first connector housing 215 is preferably rigidly fixed to the first structural member 205, and the second connector housing 220 is preferably rigidly fixed to the second structural member 210. For example, the first and second connector housings 215, 220 may be bolted to the structural members 205, 210. For example, bolts or threaded screws may be used to directly connect the first connector housing 215 to the first structural member 205, and bolts or threaded screws may be used to directly connect the second connector housing 220 to the second structural member 210. The first connector housing 215 is preferably attached to the top surface of the first structural member 205, and the second connector housing 220 is preferably attached to the top surface of the second structural member 210.

As shown in FIG. 2, a fastening bracket 225 may be used, for example with bolts or threaded screws, to fix the first connector housing 215 to the first structural member 205, and/or to fix the second connector housing 220 to the second structural member 210. The fastening bracket 225 may be an L-bracket. In some embodiments, a single fastening bracket 225 may be used for each connector housing 215, 220, and in other embodiments two fastening brackets 225 may be provided on either side of the horizontal centerline for each connector housing 215, 220. More than two fastening brackets 225 may also be utilized for each connector housing 215, 220 (e.g., four fastening brackets 225, with two provided on either lateral side).

Additionally or alternatively, the first and/or second connector housings 215, 220 may be adhered to the top surface of the first and/or second structural members 205, 210, respectively. For example, an epoxy, resin, or other adhesive agent could be used to adhere the connector housings 215, 220 to the structural members 205, 210. The fastening brackets 225 could thus be omitted when, e.g., the bottom surface of the connector housings 215, 220 is adhered to the first and second structural members 205, 210, or the fastening brackets 225 could be included and provide an additional adherence surface for robustness.

The connector housings 215, 220 may be directly connected to the first and second structural members 205, 210, respectively, such that the bottom surface of the connector housings 215, 220 directly contacts the top surface of the first and second structural members 205, 210, respectively. Both or one of the connector housings 215, 220 alternatively may be indirectly connected to the first and second structural members 205, 210, for example, using an additional shim or plate, such as a metal plate. The method of attaching the connector housings 215, 220 to the structural members 205, 210 is not limited and any known attachment/fixing method or member may be utilized (e.g., welding).

A tubular body 230 is shown in FIG. 2 as being applied on each of the first and second structural members 205, 210 and passing through the interior volume of the first and second connector housings 215, 220. The tubular body 230 may be a communication line or communication cable, such as a fiber optic cable, or any other electrical cable. The tubular body 230 may facilitate the transfer of information (e.g., audio, visual, WiFi, etc.). The tubular body 230 may be a micro duct that later may house, e.g., a fiber optic cable or other electrical line. The tubular body 230 also may comprise multiple separate wires/cables that collectively form the tubular body 230. The tubular body 230 may also include protective sheathing.

Figure 3:
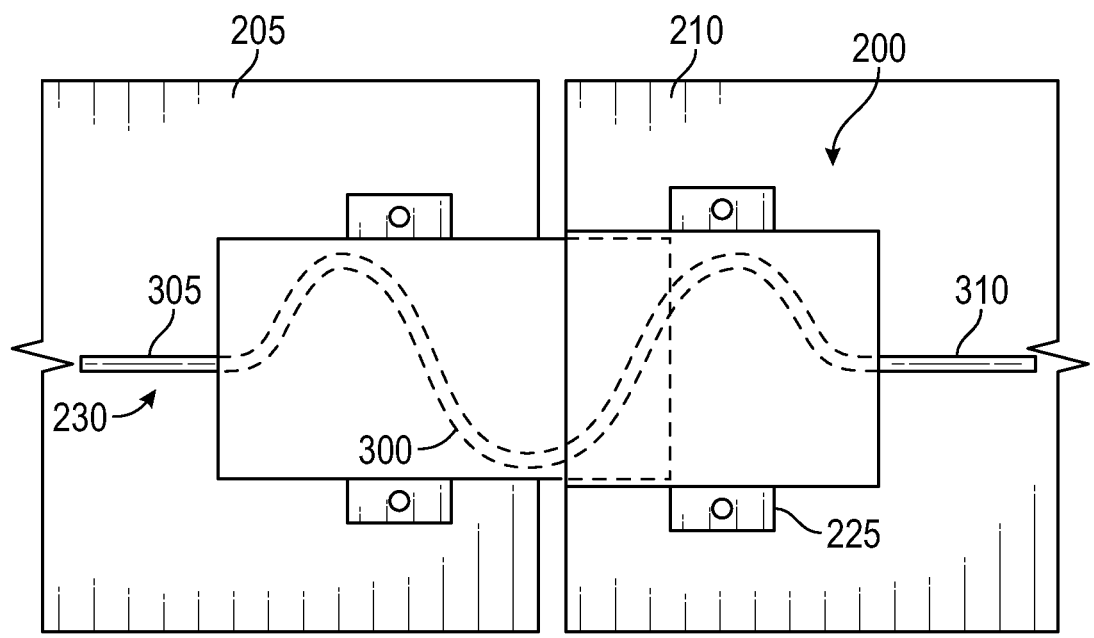
FIG. 3 is a top view of the apparatus shown in FIG. 2.

FIG. 3 shows a plan view (top view) of the apparatus 200 fixed to the first and second structural members 205, 210. As can be seen in FIGS. 2 and 3, the tubular body 230 may be non-linear within the first and second connector housings 215, 220. For example, the tubular body 230 may have a non-linear segment 300 that has, e.g., an S-shape or other curved shaped (e.g., a single arc).

The non-linear segment 300 may beneficially provide stress/strain relief for the tubular body 230 in the portion of the tubular body spanning the gap 110. For example, as the first and second structural members 205, 210 move relative to one another in the horizontal and vertical directions, the first and second connector housings 215, 220 may also move relative to one another. By providing a non-linear segment 300 of the tubular body 230 in the portion of the tubular body 230 spanning the gap 110, the tubular body 230 has the capability to expand and contract as needed to adjust for the relative movement of the first and second structural members 205, 210 and the first and second connector housings 215, 220. This configuration may help the tubular body 230 from being overly stressed and/or strained due to contraction and expansion events. This configuration may beneficially help prevent rupture of the tubular body 230.

The tubular body 230 may be adhered to the first structural member 205 and to the second structural member 210 as shown in FIGS. 2 and 3. For example, the tubular body 230 may be adhered to the first and second structural members 205, 210 in the manner described in U.S. Pat. Nos. 9,588,315 and 10,866,380, incorporated herein by reference.

For example, the tubular body 230 may be directly adhered to the top surface of the first and second structural members 205, 210 in the portions of the structural members 205, 210 immediately adjacent the first and second connector housings 215, 220, respectively, to form a first linear segment 305 and a second linear segment 310. In this manner, the tubular body 230 may be comprised of the first linear segment 305 (affixed to the first structural member 205), the non-linear segment 300 (within the first and second connector housings 215, 220), and the second linear segment 310 (affixed to the second structural member 210). The tubular body 230 is not limited to having these particular segments, however, as the tubular body 230 may be applied in other configurations (e.g., entirely non-linear, entirely linear, or variations thereof).

In some bridges, for example as shown in FIG. 1, there are numerous discrete structural members 105 utilized to form the grip and numerous expansion gaps 110 provided between adjacent structural members 105. The tubular body 230 may be provided to span the entire bridge (i.e., a singular elongated tubular body spans the entire bridge), with linear sections across the structural members 105 (such as a first structural member 205 and second structural member 210) and non-linear sections in connector housings 215, 220 provided at each gap 110. Again, the configuration is not limited to adhering the tubular body 230 in any particular shape, but there may be advantages of utilizing the linear and non-linear segments described above. In some cases, however, the load profile of the structural members 105 may introduce benefits to providing additional non-linear segments along the structural members 105 to further minimize the risk of rupture.

The top surface of the structural members 205, 210 may be smoothed to provide a smoothed linear segment, and the tubular body 230 may be applied to the smoothed linear segment, for example, as discussed in U.S. Pat. No. 10,866,380.

The tubular body 230 may be protectively encased in a resin, such as methyl methacrylate (MMA), which may be applied as a flowable resin and cured with light (e.g., UV light), oxygen, and/or a catalyst (e.g., a peroxide or hydroperoxide initiator). The curing reaction can also be activated and/or accelerated by a third compound, usually a tertiary amine. Additional details regarding protective coatings for tubular bodies on a surface are provided in U.S. Pat. Nos. 9,588,315 and 10,866,380 and International Publication No. WO 2022/010663, which are incorporated herein by reference, as any of these types of coatings and methods of protection can be employed with the tubular body 230 disclosed here.

Figure 4:
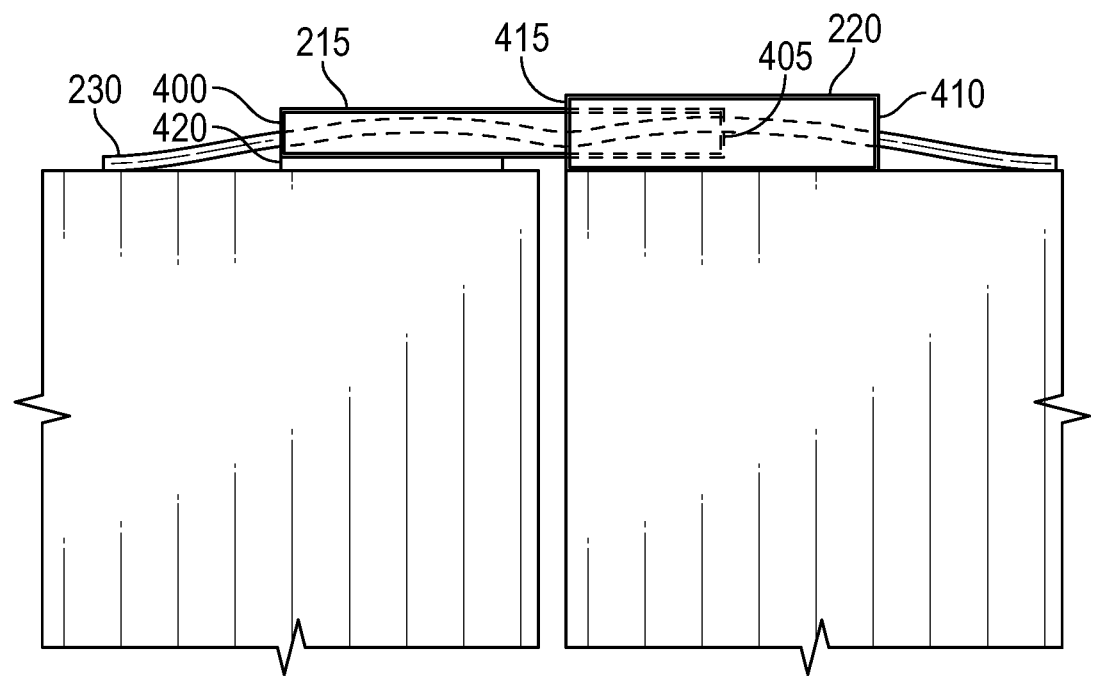
FIG. 4 is a side view of the apparatus shown in FIG. 2.

FIG. 4 shows a side view of the apparatus 200, which helps to illustrate a few other aspects of this embodiment of the joint connector apparatus 200. As can be seen in FIG. 4 (as well as in the other views shown in FIGS. 2 and 3), the first connector housing 215 possesses an exterior profile that is smaller than the interior profile of the second connector housing 220. In this manner, the first connector housing 215 fits within the second connector housing 220 and within the interior volume of the second connector housing 220.

As can be seen from FIGS. 2 and 4, each of the first and second connector housings 215, 220, include a bottom surface or bottom housing that is connected to the top surface of the first and second structural members 205, 210, respectively, and further includes side walls that extend in the horizontal direction (i.e., the direction that the tubular body extends in).

The first connector housing 215 includes a cable end 400 (immediately adjacent to the exposed cable or tubular body) and an insertion end 405 opposite the cable end 400. In FIGS. 2-4, the cable end 400 of the first connector housing 215 is the left end of the first connector housing 215 immediately adjacent the linear segment 305 of the tubular body 230. The second connector housing 220 includes a cable end 410 and a receiving end 415 opposite the cable end 410. In FIGS. 2-4, the cable end 410 of the second connector housing 220 is the right end of the second connector housing 220 immediately adjacent the linear segment 310 of the tubular body 230.

The insertion end 405 of the first connector housing 215 is configured to be inserted (i.e., is insertable) into the receiving end 415 of the second connector housing 220. The insertion end 405 of the first connector housing 215 may be designed to extend within the second connector housing 220 by a predetermined amount to account for relative movement of the first and second structural members 205, 210 in the horizontal direction. For example, the insertion end 405 of the first connector housing 215 may be spaced at least 1 inch, 2 inches, 4 inches, 6 inches, or 12 inches from the receiving end 415 of the second connector housing 220 (i.e., so that a predetermined length of the first connector housing 215 is configure to be inserted into the interior volume of the second connector housing 220 after the first and second connector housings 215, 220 are installed). Any other predetermined length may also be used, but the insertion length preferably should be selected to reflect at least the expected maximum movement in the horizontal direction of the first structural member 205 relative to the second structural member 210.

The first connector housing 215 also includes a top portion that encloses or houses the tubular body 230 within the first connector housing 215. The second connector housing 220 similarly includes a top portion that encloses or houses the tubular body 230 within the second connector housing 220.

The top portion, bottom portion, and side walls extending in the horizontal direction between the cable end 400 and insertion end 405 of the first connector housing 215 collectively define an interior volume of the first connector housing 215. While the cable end 400 and/or insertion end 405 may be open, or at least contain an opening large enough to allow the tubular body to pass therethrough, an interior volume is still formed between the top and bottom portions of the first connector housing 215 and between the cable end 400 and insertion end 405 (i.e., it may not be an entirely enclosed interior volume).

Similarly, the top portion, bottom portion, and side walls extending in the horizontal direction between the cable end 410 and receiving end 415 of the second connector housing 220 collectively define an interior volume of the second connector housing 220, with the cable end 410 and the receiving end 415 also optionally being fully open or being a wall with an opening configured to allow the tubular body 230 to pass therethrough (and in the case of the receiving end 415, sized to receive the insertion end 405 of the first connector housing 215). The insertion end 405 of the first connector housing 215 thus is inserted into the interior volume of the second connector housing 220 when the first and second connector housings 215, 220 form the joint connector apparatus 200.

In particular, the exterior profile, or outermost exterior dimension, of the first connector housing 215 is sized to be smaller than the interior profile of the second connector housing 220 so that the first connector housing 215 fits within the second connector housing 220. As can be seen in FIG. 4, the first connector housing 215 includes a mating portion 400 that is configured to fit within the interior volume of the second connector housing 220 (i.e., inside of the interior walls of the second connector housing 220).

In some embodiments, the exterior dimension of the first connector housing 215 is smaller than the interior dimension of the second connector housing 220 by a tolerance value that allows for relative movement of the first connector housing 215 relative to the second connector housing 220 in the vertical direction. For example, the first connector housing 215 may have an exterior profile spaced 0.1 to 1 inch from the upper and lower inner surfaces of the second connector housing 220. Additionally, the exterior dimension of the first connector housing 215 may be smaller than the interior dimension of the second connector housing 220 by a tolerance value that allows for relative movement of the first connector housing 215 relative to the second connector housing 220 in the horizontal direction. For example, the first connector housing 215 may have an exterior profile spaced 0.1 to 1 inch from the horizontal inner surfaces of the second connector housing 220. The dimensions are not limited in any respect, however, as a person of ordinary skill in the art will readily understand how to size the profiles of the first and second connector housings 215, 220 so that the first connector housing 215 can fit within the second connector housing 220, while allowing some tolerance between the outer and inner surfaces of the housings to accommodate movement between the first and second housings 215, 220.

As shown in FIG. 4, the first connector housing 215 may be connected to the first structural member 205 by a spacer plate 420. The spacer plate 420 may be a shim, a metal plate, or a plate of another material. Additionally, the space plate 420 may be integral with the fastening bracket 225 or may be provided as a separate component. The spacer plate 420 is positioned to space the bottom housing of the first connector housing 215 a space apart from the top surface of the first structural member 205. This spacing may help beneficially facilitate the insertability of the first connector housing 215 into the second connector housing 220 (e.g., when the first and second structural members 205, 210 have planar top surfaces, the first connector housing 215 may need to be spaced above the top surface of the first structural member 205 in order to enter the second connector housing 220).

The second connector housing 220 may be directly connected to the second structural member 210 as also shown in FIG. 4. This configuration allows the bottom surface of the first connector housing 215 to fit inside of the interior volume of the second connector housing 220. In other embodiments, both the first and second connector housings 220 may be indirectly connected to the surface of the first and second structural members 205, 210, respectively, with the first connector housing 215 being spaced farther from the top surface of the first structural member 205 than the spacing of the second connector housing 220 from the top surface of the second structural member 210.

Alternatively, the first connector housing 215 may be directly connected to the first structural member 205 and may be gradually tapered toward the insertion end 405 (i.e., gradually tapering at least in the vertical direction and optionally also gradually tapered in the horizontal direction). Alternatively, the first connector housing 215 may be directly connected to the first structural member 205 and may be formed with a stepped outer dimension (which may also be known as a tiered taper, stepped taper, or incremental taper) at least in the vertical direction (and optionally in the horizontal direction) such that the insertion end 405 has a smaller exterior profile than the cable end 400.

A person of ordinary skill in the art will understand that any different configurations of spacing plates, L-brackets, tapered profiles, stepped profiles, etc., can be employed for each of the first and second connector housings 215, 220, as long as the bottom housing at the insertion end 405 of the first connector housing 215 is vertically above the bottom housing at the receiving end 415 of the second connector housing 220 when the first connector housing 215 is fixed to the top surface of the first structural member 205, the second connector housing 220 is fixed to the top surface of the second structural member 210, and the top surfaces of the first and second structural members 205, 210 are planar. It also should be noted that while the first connector housing 215 is described and depicted as being insertable into or inserted into the second connector housing 220, the configuration is not limited in this respect; the second connector housing 220 can instead be sized to fit within the first connector housing 215 in the same manner as described.

Additionally, the tubular body 230 may be non-linear in the vertical direction within the interior volumes of the first and second connector housings 215, 220 as shown in FIG. 4. For example, the tubular body 230 may be curved or S-shaped in the vertical direction within the first and second connector housings 215, 220. Such a configuration may provide additional strain relief when the first and second structural members 205, 215 move relative to one another as discussed above.

Alternatively, the top housing and bottom housing of the first connector housing 215 may be spaced apart from one another by a distance equal to the outer diameter of the tubular body 230. In such a configuration, the tubular body 230 may not be movable in the vertical direction and may only have stress/strain relief in the horizontal direction.

Additionally, the interior volume of the first and/or second connector housing 215, 220 may include a protective material such as an epoxy or resin. The interior volume of the housing 215, 220 preferably includes some amount of space to provide strain relief to the tubular body 230, but some amount of protective material may also be included within the first and second connector housings 215, 220. For example, it may be easier and more efficient to install the tubular body along with some amount of protective material (e.g., if the adjacent regions on the structural members are receiving the protective material). A few locations within the housings 215, 220 could also receive the protective/adhering coating so that there are separate strain/stress relief portions of the tubular body 230 within the first and second connector housings 215, 220.

The first and second connector housings 215, 220 are not limited to any particular material. For example, the first and second connector housings 215, 220 may be metal, such as steel, copper, aluminum, or a metal alloy. In some embodiments, the first and second connector housings 215, 220 may be designed to withstand vehicle loading and/or surface forces (e.g., from a snowplow). The first and second connector housings 215, 220 may have a tapered cross section to facilitate, e.g., vehicle traffic (in other words, forming a speedbump-type shape). The first and second connector housings 215, 220 may be particularly robust/rugged materials to withstand these external forces. The first and second connector housings 215, 220 are preferably the same material as each other, but the invention is not limited in this respect.

Figure 5:
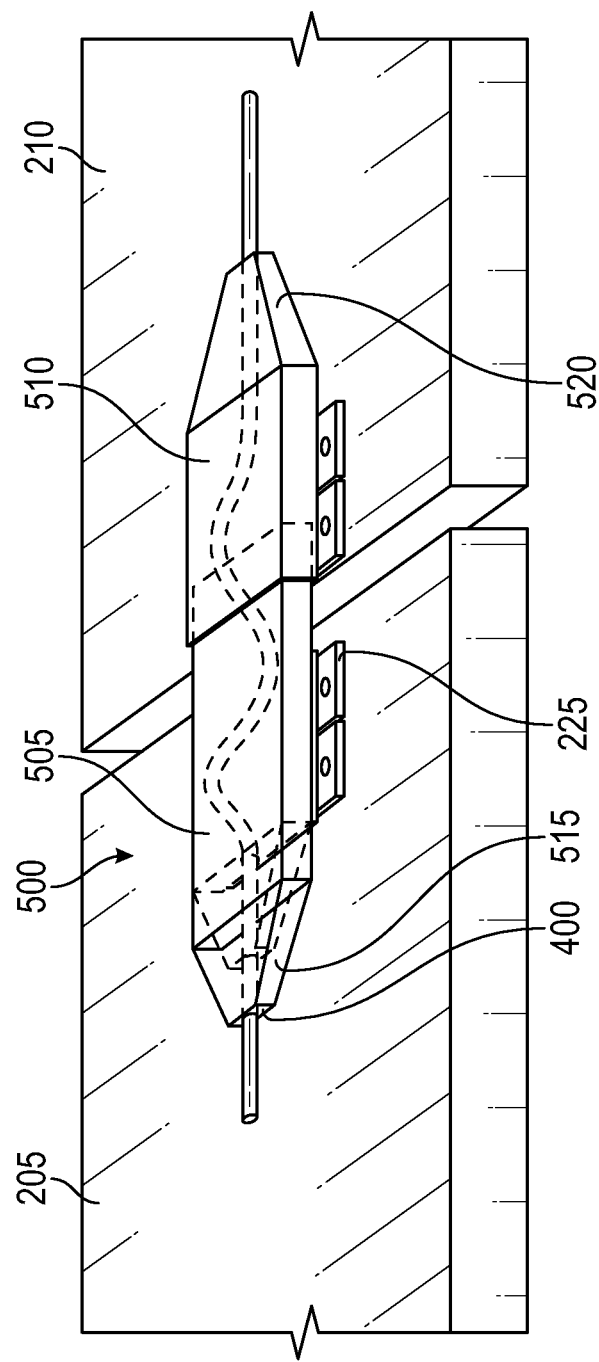
FIG. 5 is a perspective view of another embodiment of the disclosed apparatus spanning a gap between adjacent structural members, with a tubular body passing through the apparatus.

FIG. 5 shows another embodiment of the joint connector apparatus 500. As shown in FIG. 5, the apparatus 500 includes a first connector housing 505 and a second connector housing 510. The first and second connector housings 505, 510 are generally similar to the first and second connector housings 215, 220 described above, and aspects that have already been described will not be repeated.

The first connector housing 505 includes a first tubular body receiving member 515, and the second connector housing 510 includes a second tubular body receiving member 520. The first and second tubular body receiving members 515, 520 are positioned at the cable end of the first and second connector housings 505, 510, respectively (i.e., the end of the connector housing that is immediately adjacent to where the tubular body 230 is fixed on the structural member 205, 210). The first tubular body receiving member 515 may be a tapered end piece to direct the tubular body 230 towards the point that the tubular body 230 is fixed to the first structural member 205 (e.g., the beginning of the linear segment 305 described above). Similarly, the second tubular body receiving member 520 may be a tapered end piece to direct the tubular body 230 towards the point that the tubular body 230 is fixed to the second structural member 210 (e.g., the beginning of the linear segment 310 described above).

The first and second tubular body receiving members 515, 520 may be gradually tapered or possess a stepped inner dimension (which may also be known as a tiered taper, stepped taper, or incremental taper). The first tubular body receiving member 515 may be integrally formed as a single unitary component with the remainder of the first connector housing 505, or the first tubular body receiving member 515 may be a separately manufactured component that is connected to the remainder of the first connector housing 505. Similarly, the second tubular body receiving member 520 may be integrally formed as a single unitary component with the remainder of the second connector housing 510, or the second tubular body receiving member 520 may be a separately manufactured component that is connected to the remainder of the second connector housing 510.

As shown in FIG. 5, the first and second connector housings 505, 510 may include four fastening brackets 225. The apparatus 500 is not limited thereto, however, and may for example include one or two fastening brackets 225 for each of the first and second connector housings 505, 510.

The first and second connector housings 505, 510 are depicted in FIG. 5 with gradually tapering first and second tubular body receiving members 515, 520. However, the exterior surface of the first tubular body receiving member 515 could alternatively be provided as uniform with (i.e., equal in outer dimension to) the remainder of the first connector housing 505, such that only the interior wall tapers towards the cable end 400 of the first connector housing 505. The second tubular body receiving member 520 could be configured in the same manner in some embodiments.

Figure 6:
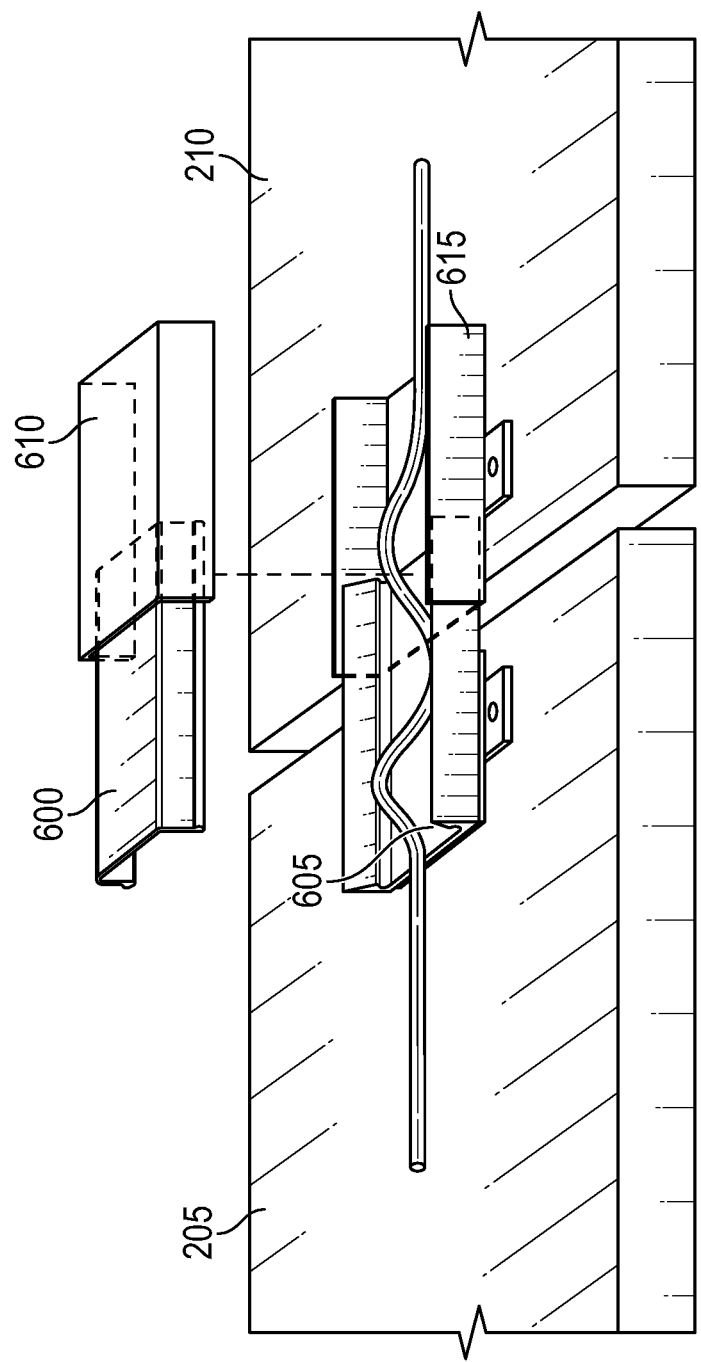
FIG. 6 is a perspective view showing the assembly of the embodiment of the apparatus shown in FIG. 2.

FIG. 6 helps illustrate the method of applying the tubular body 230 and the apparatus 200 to the gap 110 between adjacent structural members 205, 210. In particular, FIG. 6 shows an assembly view of an embodiment of the disclosed joint connector apparatus 200. The first connector housing 215 includes a top lid 600 (also referred to as a top portion of the housing or a top housing) and a bottom housing 605 (also referred to as a bottom portion of the connector housing). The second connector housing 220 also has a top lid 610 and a bottom housing 610.

To install the tubular body 230 and the apparatus 200 to the first and second structural members, it may be beneficial to follow a particular order of steps for installation efficiency. In this embodiment, first, the bottom housing 615 of the second connector housing 220 is fixed to the second structural member 210 (e.g., optionally using fastening brackets 225). Second, the bottom housing 605 of the first connector housing 215 is fixed to the first structural member 205. Since the bottom housing 615 of the second connector housing 220 has already been fixed to the second structural member 210, the insertion end 405 of the bottom housing 605 of the first connector housing 215 can be inserted into the receiving end 415 of the bottom housing 615 of the second connector housing 220. In other words, since there are no top portions yet installed, the first connector housing 215 may be readily installed onto both the first structural member 205 while simultaneously being inserted into the second connector housing 220.

Next, the tubular body 230 may be applied to the first and second structural members 205, 210 and into the open interior portion of the bottom housings 605, 615. The tubular body 230 may be fixed or adhered to the top surface of the first and second structural members 205, 210 as previously described (e.g., optionally with a smoothing step and/or optionally to form a linear segment). The tubular body 230 may also be provided with the non-linear segment 300 in the first and second connector housing 215, 220 during this step to provide a strain relief for the tubular body 230. A protective material may be provided during this step as previously described.

The top lid 600 of the first connector housing 215 is next installed onto the bottom housing 605 to enclose the tubular body 230 within the first connector housing 215. The components are dimensioned so that the top lid 600 fits within the bottom housing 615 of the second connector housing 220 in the lateral direction, preferably according to a particular tolerance (i.e., there is a gap between the outer wall of the top lid 600 and the inner wall of the bottom housing 615). For example, the tolerance may be to 1 inches, e.g., 0.5 inches.

The top lid 610 of the second connector housing 220 is next installed onto the bottom housing 615 to enclose the tubular body 230 within the second connector housing 220. The components are dimensioned so that the top lid 605 fits around the exterior profile of the top lid 600 such that the first connector housing 215 is inserted into the interior volume of the second connector housing 220. There is preferably a gap between the upper surface of the top lid 600 of the first connector housing 215 and the lower surface of the top lid 610 of the second connector housing 220 in the vertical direction, preferably according to a particular tolerance (i.e., there is a gap between the outer wall of the top lid 600 and the inner wall of the top lid 610). For example, the tolerance may be 0.1 to 1 inches, e.g., 0.5 inches.

Figure 7:
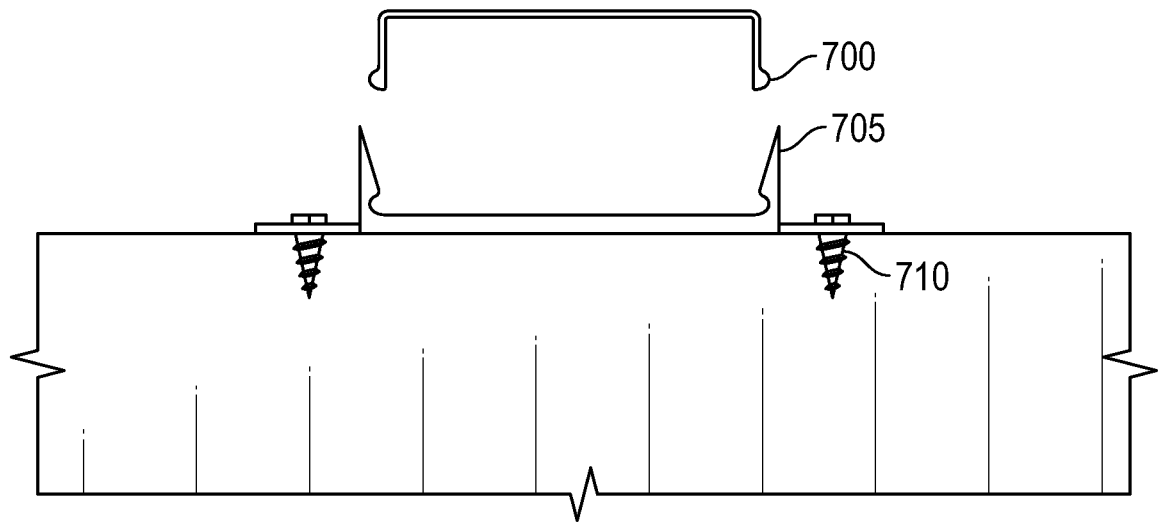
FIG. 7 is an end view of a portion of FIG. 6.

As can be seen in FIG. 7, the top lids 600, 610 may be provided with protruding locking members 700 that engage with receiving locking members 705 on the respective bottom housings 605, 615. This design allows the top lids 600, 610 to conveniently and securely connect to the (previously installed) bottom housings 605, 610. The connection of the top lids 600, 610 and bottom housings 605, 615 are in no way limited to these particular locking members, however, as any known fastening or connecting methods and/or components may be utilized.

Further, in some embodiments, the first and second connector housings 215, 220 may each be provided as a single unitary structure without a separable top lid 605, 610. Instead, the second connector housing 220 may be installed on the second structural member 210, and then the first connector housing 215 may be inserted into the second connector housing 220 and installed on the first structural member 205. Thereafter, the tubular body 230 may be installed on either the first or second structural member 205, 210 and then pushed through (e.g., using pressurized air or other injection means) the interior volume of the first and second connector housings 215, 220, and finally installed on the other of the first or second structural member 205, 210. In another embodiment, the first and second connector housings 215, 220 could be placed on or near the gap 110, the tubular body 230 passed therethrough, and then after the tubular body 230 is in the interior volume of the first and second connector housings 215, 220, the first and second connector housings 215, 220 are affixed to the first and second structural members 205, 210. A person of ordinary skill in the art will understand that other installation orders and variations are possible and within the scope of the disclosure.

FIG. 7 additionally shows that the bolts 710 may be threaded screws that secure into the structural members 205, 210.

Figure 8:
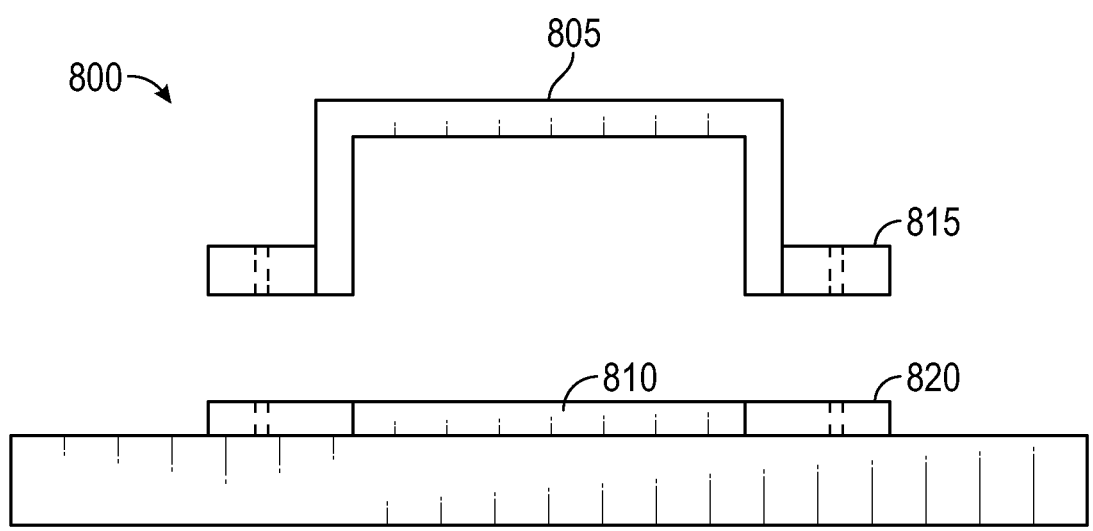
FIG. 8 is an end view showing the assembly of another embodiment of the disclosed apparatus.

FIG. 8 shows another embodiment of a joint connection apparatus 800. As shown in FIG. 8, each of the first and second connector housings may include a top housing 805 and a bottom housing 810. The top housing 805 includes a flared connection joint 815 that allows the top housing 805 to be fixed to the first or second structural member 205, 210. For example, the flared connection joint 815 may be integrally formed with a remainder of the top housing 805 and may contain a hole that allows a bolt or screw to pass therethrough and to mate with a hole in the first or second structural member 205, 210. Alternatively, the flared connection joint 815 may be provided as a separate component (e.g., an L-bracket) that attaches to the remainder of the top housing 805 and allows the top housing to connect to the first or second structural member 205, 210 as described.

The top housing 805 in the joint connection apparatus 800 of FIG. 8 is sized to be larger than the bottom housing 810 such that the inner wall of the top housing 805 is positioned outside of (e.g., to enclose) the outer wall of the bottom housing 810 in the lateral direction. The bottom housing 810 may be adhered to the first or second structural members 205, 210 without a bolt or screw or by using bolt(s) and/or screw(s) in the interior portion of the bottom housing 810.

Alternatively, as shown in FIG. 8, the bottom housing 810 may include one or more flared connection joints 820 that is integral with the remainder of the bottom housing 810 or is a separate component that attaches to the remainder of the bottom housing 810 (e.g., an L-bracket). The flared connection joint 820 of the bottom housing 810 is configured to be aligned with the flared connection joint 815 of the top housing 805 so that a bolt or screw can pass through a hole in each of the flared connection joints 815, 820 to secure both the top and bottom housings 805, 810 to the first and second structural member 205, 210.

Alternatively, the connections may use any type of adhesives to connect the components without use of a bolt or screw. In other words, the flared connection joint 815 of the top housing 805 may not include a thru-hole and may instead adhere to the first or second structural member 205, 210 to enclose the bottom housing 810 when the bottom housing 810 does not include a flared connection joint 820. When the bottom housing 810 does include one or more flared connection joints 820, those flared connection joint(s) 820 may be directly adhered to the top surface of the first or second structural member 205, 210 and the flared connection joint(s) 815 of the top housing 805 may be directly adhered to top surface of the flared connection joint(s) 820.

Also, the bottom housing 810 of this embodiment may be a flat plate as shown in FIG. 8, or it may have side walls that extend within the top housing 805 when the top housing 805 is secured to the first or second structural member 205, 210. It may be preferable to include side walls that extend within the top housing 805 (e.g., as in the embodiment shown in FIG. 7) to help ensure that the cable is not pinched by the top housing 810 during installation and/or movement of the structural members 205, 210.

Additionally, the bottom housing 810 of the second connector housing 220 may be omitted. In this example, the bottom housing 810 of the first connector housing 220 will span the gap 110 between adjacent structural members 205, 210. The tubular body 230 may contact the second structural member 210 inside of the second connector housing 220 and may traverse across the top surface of the bottom housing 810 of the first connector housing 220. In this example, the spacer plate 420 could be omitted. Alternatively, the spacer plate 420 could be retained to create a larger tolerance in the vertical direction for relative movement between the first and second structural members 205, 210. For example, a space between the bottom surface of the bottom housing 810 of the first connector housing 215 and the top surface of the second structural member 210 (when the first and second structural members are in a static, planar state) of 0.1 to 1 inch, e.g., 0.5 inches, may be used.

A person of ordinary skill in the art will understand that other variations of connecting the top housing 805 and bottom housing 810 to one another and/or to the first and second structural member 205, 210 are within the scope of this disclosure, as well as different configurations and shapes of the top and bottom housings 805, 810.

Figure 9:
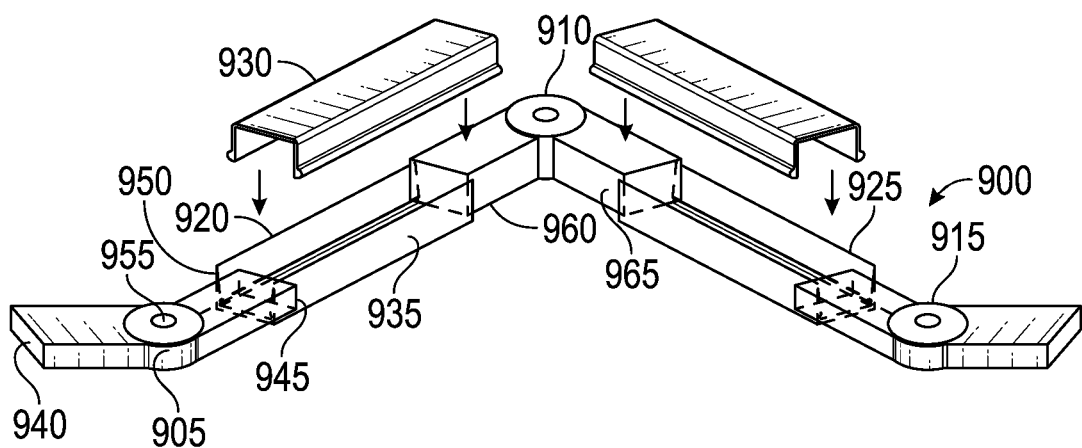
FIG. 9 is a perspective view of another embodiment of the disclosed apparatus.

FIG. 9 shows a perspective view of another embodiment of a joint connector apparatus 900. This apparatus includes a first connector joint 905, a second connector joint 910, and a third connector joint 915. The first connector joint 905 may be fixed to a first structural member 205 and the third connector joint 915 may be fixed to an adjacent second structural member 210. The second connector joint 910 is positioned between the first and third connector joints 905, 915 in the horizontal direction (e.g., at a midpoint between the first and third connector joints 905, 915), and is positioned vertically above the first and third connector joints 905, 915 when the first and third connector joints 905, 915 are connected to the first and second structural members 205, 210, respectively.

The first connector joint 905 is connected to the second connector joint 910 by a first housing 920. The third connector joint 915 is connected to the second connector joint 910 by a second housing 925. The first housing 920 includes a top lid 930 and a bottom housing 935. The top lid 930 and bottom housing 935 may connect to one another as described with respect to FIG. 7. The second housing 925 may be configured in a similar manner. Alternatively, the first and/or second housing 920, 925 may be formed a unitary structure. The first and second housing 920, 925 are formed to be hollow or largely devoid of any interior material to allow a tubular body (e.g., a communication line) to pass therethrough.

The first connector joint 905 includes a cable end 940 and an insertion end 945. The interior of the first connector joint 905 is preferably entirely or largely hollow such that a tubular body 230 may pass therethrough. The cable end 940 may be tapered as described above with respect to FIG. 6. The insertion end 945 is sized to fit within a receiving end 950 of the first housing 920. A tolerance may be provided to allow the insertion end 945 of the first connector joint 945 to be able to move by a predetermined amount relative to the first housing 920.

The first connector joint 905 may be cylindrical and include a pivot 955. The pivot 955 may allow the insertion end 945 of the first connector joint 905 to rotate relative to the cable end 940 of the first connector joint 905. When the first connector joint 905 is fixed on a first structural member 205, this means that the insertion end 945 is rotatable relative to the first structural member 205. The first connector joint 905 may be designed such that the insertion end 945 is only able to rotate for a predetermined amount relative to the cable end 940. For example, the insertion end 945 may only be able to rotate between 120° and 180° relative to the cable end 940. In another example, the insertion end 945 may only be able to rotate between 135° and 175° relative to the cable end 940, or more preferably 150° and 170°. By only permitting rotation within a predetermined angle range, excessive torque may be prevented. For example, it may be beneficial to avoid allowing the insertion end 945 to rotate to a position at 180° relative to the cable end 940 because the weight/loading force of the second connector joint 910 and first and second housings 920, 925 may cause the second connector joints 910 to extend into the expansion gap 110, which may not be desirable in some arrangements.

The third connector joint 915 may be configured in the same manner as the first connector joint 905. The first and third connector joints may be each be a ball joint, a ball and socket joint provided with an opening therethrough, or a hollow cylindrical joint. A person of ordinary skill in the art would understand that the joint is not limited thereto, and other types of joints would work for this arrangement.

The second connector joint 910 also may be a ball joint, a ball and socket joint provided with an opening therethrough, or a hollow cylindrical joint. The second connector joint 910 is also not limited, and other types of joints would work for this arrangement. The second connector joint 910 includes two insertion ends 960, 965 that are sized to be inserted into the first and second housings 920, 925 as shown in FIG. 9. Alternatively, the second connector joint 910 could include two receiving ends sized to receive the respective ends of the first and second housings 920, 925. The second connector joint 910 is also hollow (devoid of a material in the interior of the joint) or largely hollow, and allows a tubular body to pass therethrough.

Accordingly, a tubular body 230 may be installed on the first structural member 205, pass through the apparatus 900 (i.e., through the interior of the first joint connector 905, the first housing 920, the second joint connector 910, the second housing 925, and the third joint connector 915), and onto the second structural member 210 to be fixed on the second structural member 210. In this manner, the joint connector apparatus 900 allows for a tubular body to continuously pass therethrough while accounting for the relative movement of the first and second structural members 205, 210.

While examples of tolerances and spacing values between the various components of the apparatus 200, 500, 800, 900 are identified above, the scope of the disclosure should not be understood as limited to any particular tolerances and/or spacings between components. Further, the joint connection apparatus 200, 500, 800, 900 may include resilient mounting that provides additional robustness, and/or allows for smaller tolerances, to account for movement between adjacent structural members 105. For example, the first and second connector housings 215, 220 may be installed so that can move to some extent relative to the first and second structural members 205, 220 (e.g., by using any resilient mounting technique or using bolts/screws that are tightened only to a predetermined threshold that allows some movement by the connector housing 215, 220). The method and components for mounting the disclosed apparatus 200, 500, 800, 900 to the structural members 105 is not limited, and variations that would be understood by a person of ordinary skill in the art should be understood as within the scope of this disclosure for all of the various embodiments disclosed herein.

Figure 10:
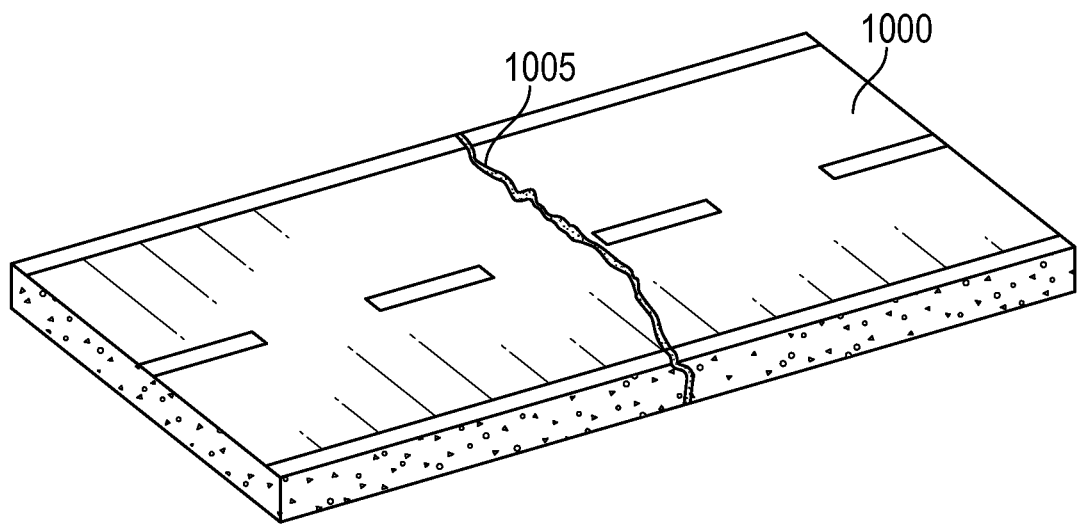
FIG. 10 is a perspective view of a paved surface with a crack.

FIG. 10 depicts a paved surface 1000 with a crack 1005. The paved surface 1000 may formed from, e.g., concrete and/or asphalt. The paved surface 1000 may include additives or other materials and may be used for pedestrian pathways or vehicle roadways. The type of paved surface 1000 is not limited, however, and should be understood to include any man-made surfaces that have been smoothed, e.g., roadways, highways, tunnels, parking lots, paved surfaces in parking garages, airport runways, driveways, and sidewalks.

The crack 1005 shown in FIG. 10 extends across the paved surface 1000 in the transverse or horizontal direction (i.e., perpendicular to the longitudinal direction of the paved surface 1000). The crack 1005 is not limited, however, to any particular orientation or type of crack 1005. For example, the crack 1005 may be a fatigue crack, alligator crack, block crack, edge crack, longitudinal crack, transverse crack, reflection crack, and slippage crack. When deploying a tubular body (discussed below) on the paved surface 1000 generally in the longitudinal direction, however, the disclosed apparatus may be particularly useful for transverse cracks such as the crack 1005 shown in FIG. 10 because this type of crack is rather prevalent and cannot be easily avoided by altering the deployment path.

As described in U.S. Pat. No. 10,866,380, incorporated herein by reference, a tubular body (e.g., a communication cable such as fiber optic cable) can be applied directly to the top surface of a paved surface, such as the paved surface 1000 shown in FIG. 10. The technique described in U.S. Pat. No. 10,866,380 generally involves smoothing the top surface of the paved surface 1000 to form a smoothed segment and applying a tubular body within the smoothed segment.

Figure 11:
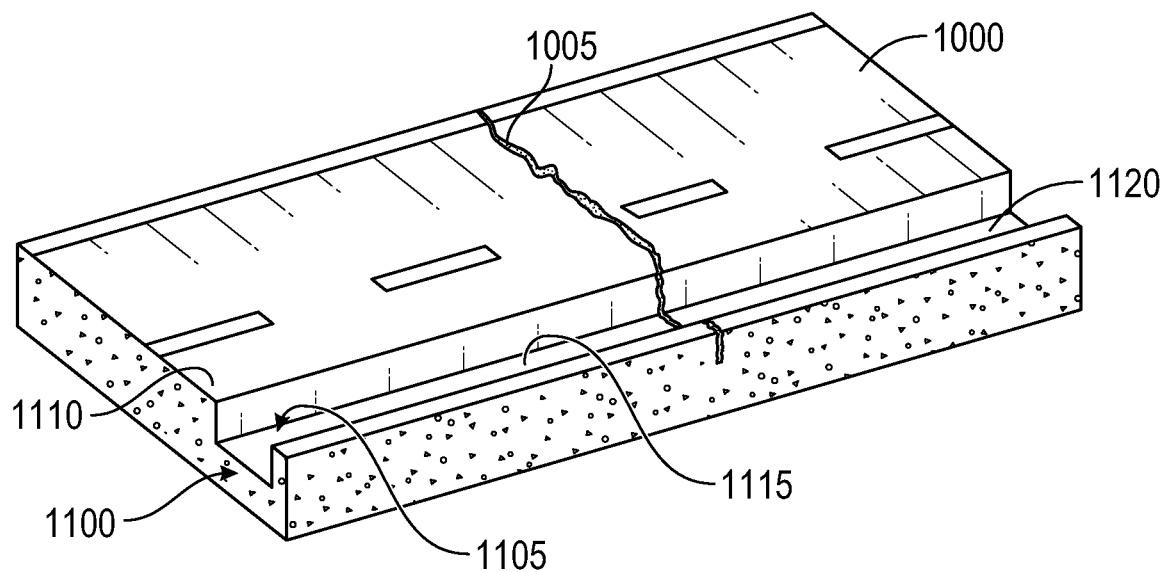
FIG. 11 is a perspective view showing an embodiment of a smoothed segment in a paved surface with a crack.

FIG. 11 illustrates a smoothed segment 1100 formed in the paved surface 1000. The smoothed segment 1100 may be machined such that the bottom surface 1105 of the smoothed segment 1100 is smoother (i.e., more smooth) than the remainder 1110 of the paved surface. The smoothed segment 1100 may be linear, as shown in FIG. 11, or may be generally linear such that there are some curvatures in the longitudinal extent of the smoothed segment 1100. The bottom surface 1105 of the smoothed segment 1100 may be at surface level (i.e., planar to the top surface of the paved surface 1000) or may be slightly below surface level. For example, the bottom surface 1105 of the smoothed segment 1100 may be less than 10 millimeters, preferably 1 to 8 millimeters, below the top surface of the paved surface 1000. This particular depth range provides a particular benefit in that it allows the final installation (with the coating described below) to be flush (planar) with the paved surface 1000, yet it provides an extremely minimal structural impact to the paved surface 1000. In another example, the remainder 1110 of the paved surface 1000 may include surface irregularities introduced when the paved surface 1000 was created (see U.S. Pat. No. 10,866,380 for additional details) and the bottom surface 1105 may be above or at the same depth as the lowest point of the naturally formed surface irregularities.

In this application, the smoothed segment 1100 may be referred to as a "groove" because it is a purposefully-machined section of the paved surface that typically has a bottom surface 1105 at least minimally below the top of the natural surface irregularities in the paved surface. However, the use of "groove" should not be understood to necessarily require that the smoothed segment 1100 extends below the remainder 1110 of the paved surface 1000 by any particular depth. In other words, even if this application discusses a "groove," this should be understood to include a smoothed segment that does not extend below the lowest point of the surface irregularities in the paved surface 1000.

The smoothed segment 1100 is not limited to any particular width. Typically, the smoothed segment 1100 will be much narrower than what is shown in FIG. 11, which includes an enlarged smoothed segment 1100 for illustrative purposes. For example, the smoothed segment 1100 may be 0.5-12 inches, or more preferably 1-3 inches, when fiber optic cable is deployed. The width of the smoothed segment 1100 should generally be selected based on the dimensions of the tubular body and on the dimensions and arrangement of the paved surface 1000.

As shown in FIG. 11, the smoothed segment 1100 is formed to extend through the crack 1005. In other words, a smoothing apparatus, such as that described in U.S. Pat. No. 10,866,380, may be used to form the smoothed segment continuously in the paved surface 1000, thereby creating a first smoothed segment 1115 on one side of the crack 1005 and a second smoothed segment 1120 on the opposite side of the crack 1005.

Figure 12:
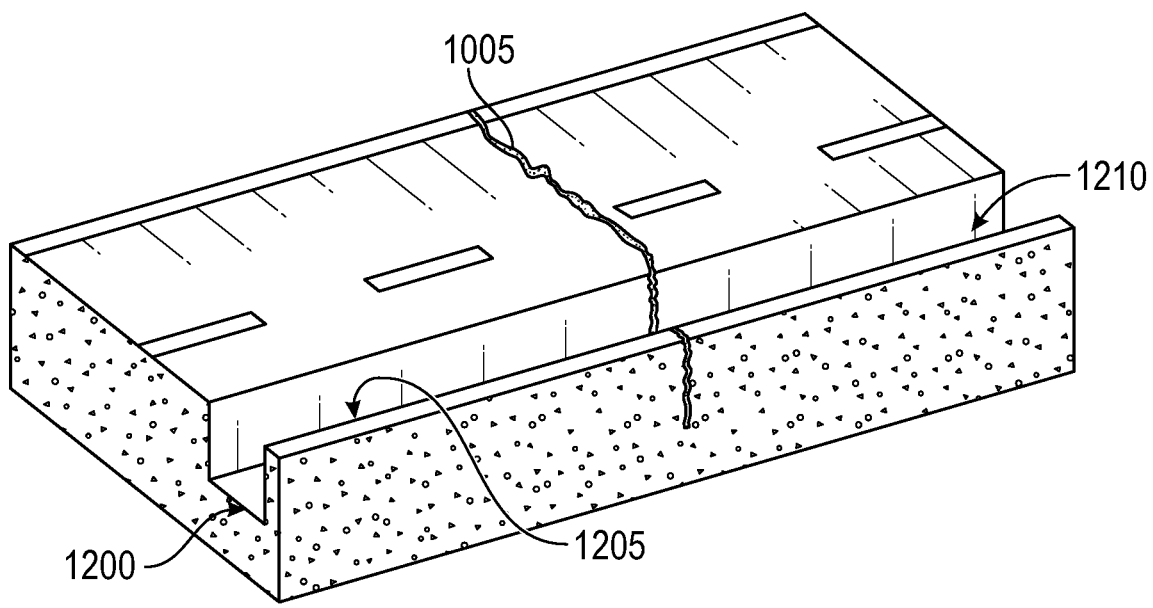
FIG. 12 is a perspective view showing an embodiment of a microtrench in a paved surface with a crack.

FIG. 12 shows an embodiment that includes forming a trench 1200 in the paved surface 1000. Typically, either a smoothed segment 1100 or a trench 1200 would be formed, but not both (i.e., to install a tubular body into one of them). The trench 1200 shown in FIG. 12 is an example of a microtrench. A microtrench typically ranges from about one to two feet in depth, as discussed above. Accordingly, the trench 1200 has a greater depth than the smoothed segment 1100 shown in FIG. 11. The trench 1200 is not limited to being a microtrench, however, and may be a trench in the paved surface 1000 of any desired dimension to receive a tubular body or a plurality of tubular bodies. Regardless of the exact dimensions, the trench 1200 is formed in a similar manner to the smoothed segment 1100 such that it passes continuously from one side of the crack 1005 through to the other side of the crack 1005, and thereby possesses a first trench segment 1205 and a second trench segment 1210.

Figure 13:
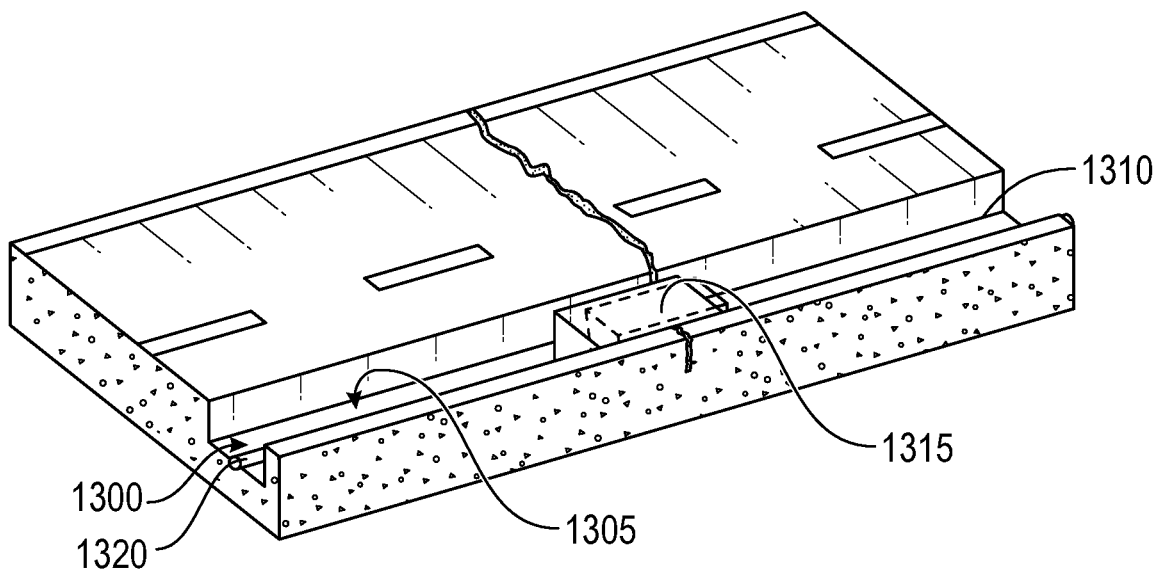
FIG. 13 is a perspective view showing an embodiment of the disclosed connection apparatus fixed in the groove.

FIG. 13 shows a groove 1300 in the paved surface 1000. The groove 1300 may be either a smoothed segment 1100 or a trench 1200. The groove 1300 extends across/through the crack 1005, thereby possessing a first groove segment 1305 on one side of the crack 1005 and a second groove segment 1310 on the other side of the crack 1005.

An embodiment of the disclosed connection apparatus 1315 is shown within the groove 1300 of FIG. 13. The portion of the tubular body 1320 that is passes over/through the crack 1005 in a paved surface 1000 can be placed inside the connection apparatus 1315 to help provide structural support for the tubular body 1320 across the crack. The connection apparatus 1315 is comprised of two separate parts, i.e., a first connector apparatus and a second connector apparatus which are described in more detail below.

The tubular body 1320 may be any elongated, tubular structure. For example, the tubular body 1320 may be an elongated pipe, conduit, communication line, communication cable, fiber optic cable, wire, sheathing, or any combination of these types of tubular structures. The disclosure of this application is not limited to any particular type of tubular body 1320. As can be seen in FIG. 13, the tubular body 1320 can pass continuously within the groove 1300 and through the connection apparatus 1315 across the crack 1005. In this manner, the connection apparatus 1315 connects the first groove segment 1305 to the second groove segment 1310 by forming a bridge from the first groove segment 1305, over the crack 1005, to the second groove segment 1310, such that the tubular body 1320 may continuously extend in the groove 1300 from the first groove segment 1305, along the connection apparatus 1315, and on to the second groove segment 1310.

After the tubular body 1320 is deployed within the groove 1300 and through the connection apparatus 1315, a protective coating may be applied to protectively encase the tubular body 1320 in the groove 1300. For example, methyl methacrylate (MMA) may be applied as a flowable resin and cured with light (e.g., UV light), oxygen, and/or a catalyst (e.g., a peroxide or hydroperoxide initiator). The curing reaction can also be activated and/or accelerated by a third compound, usually a tertiary amine. Additional details regarding protective coatings for tubular bodies on a surface are provided in U.S. Pat. Nos. 9,588,315 and 10,866,380 and International Publication No. WO 2022/010663, which are incorporated herein by reference, as any of these types of coatings and methods of protection can be employed with the tubular body 230 disclosed here.

The protective coating may be deployed only on portions of the exposed tubular body 1320 (and thus not directly on the connection apparatus 1315). In some embodiments, the groove 1300 may be formed, and the protective coating applied, such that the final installed arrangement is flush (i.e., planar) with the top surface of the paved surface 1000. In these embodiments, the connection apparatus 1315 may also be installed such that it's uppermost-layer is flush with the top layer of the protective coating and the paved surface 1000.

Alternatively, the connection apparatus 1315 may be installed as shown in FIG. 13, such that its top surface is spaced slightly below the top surface of the paved surface 1000. In this arrangement, the protective coating may be continuously applied to cover both the exposed portions of the tubular body 1320 and the top surface of the connection apparatus 1315. In still further embodiments, the protective coating and/or connection apparatus 1315 may protrude above the top surface of the paved surface 1000, e.g., as described in U.S. Pat. No. 9,588,315.

Figure 14:
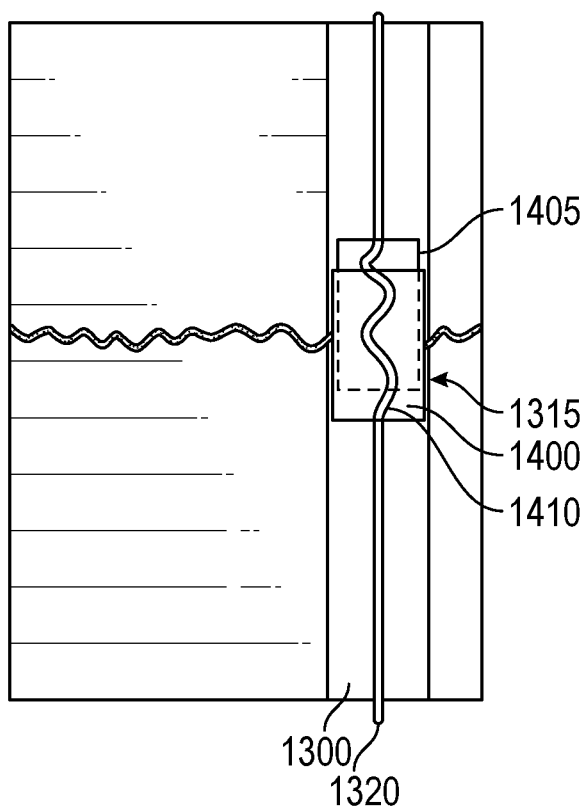
FIG. 14 is a top view of the connection apparatus shown in FIG. 13.

FIG. 14 provides a plan view showing the connection apparatus 1315 and the tubular body 1320 within the groove 1300. As shown in FIG. 14, the connection apparatus 1315 can be comprised of two parts. In particular, the connection apparatus 1315 includes a first connector apparatus 1400 (also referred to as a first connector housing) and a second connector apparatus 1405 (also referred to as a second connector housing). The first connector apparatus 1400 is fixed in and/or attached to the first groove segment 1305 and the second connector apparatus is fixed in and/or attached to in the second groove segment 1310.

FIG. 14 also shows that the tubular body 1320 can be positioned in the groove 1300 and the portion of the tubular body 1320 that is positioned over the crack 1005 can be placed inside the first and second connector apparatuses 1400, 1405. In some embodiments, the tubular body 1320 may be deployed such that it forms a curved segment 1410 in the interior of the first and second connector apparatuses 1400, 1405. The curved segment 1410 may have any non-linear shape, for example, an S-shape or other curved shaped (e.g., a single arc).

The curved segment 1410 may beneficially provide stress/strain relief for the tubular body 1320 in the portion of the tubular body spanning the crack 1005. For example, as the first and second groove segments 1305, 1310 move relative to one another in the horizontal and/or vertical directions (e.g., based on temperature fluctuations and/or loading changes), the first and second connector apparatuses 1400, 1405 may also move relative to one another. By providing a curved segment 1410 of the tubular body 1320 in the portion of the tubular body 1320 within the first and second connector apparatuses 1400, 1405, there is more length of the tubular body 1320 within the first and second connector apparatuses 1400, 1405 than there would be if the tubular body 1320 extended through the first and second connector apparatuses 1400, 1405 linearly. With this additional length, the tubular body 1320 has the capability to expand and contract as needed to adjust for the relative movement of the first and second connector apparatuses 1400, 1405. This configuration may help the tubular body 1320 from being overly stressed and/or strained due to contraction and expansion events. This configuration may also beneficially help prevent rupture of the tubular body 1320.

In some embodiments, the first connector apparatus 1400 extends over the crack 1005 such that one end is in the first groove segment 1305 and the other end is in the second groove segment 1310. Similarly, in some embodiments, the second connector apparatus 1405 extends over the crack 1005 such that one end is in the second groove segment 1310 and the other end is in the first groove segment 1305.

In some embodiments, only one of the first connector apparatus 1400 and the second connector apparatus 1405 extends over the crack 1005. In other words, both ends of the first connector apparatus 1400 may be fixed in the first groove segment 1305 and the second connector apparatus 1405 may extend across the crack 1005 into (or around) the first connector apparatus 1400. The opposite arrangement is also possible, i.e., the second connector apparatus 1405 is fixed entirely within the second groove segment 1310 and the first connector apparatus 1400 extends across the crack 1005 into (or around) the second connector apparatus 1405.

It is preferable that at least one of the first connector apparatus 1400 and the second connector apparatus 1405 extend across the crack, however, so that the tubular body 1320 may pass continuously across the crack 1005 while being supported by the connection apparatus 1315. In some embodiments, one or both of the first connector apparatus 1400 and second connector apparatus 1405 extend partially into the crack 1005, such that one end of the respective connector apparatus 1400, 1405 terminates in the crack 1005.

The first connector apparatus 1400 may be attached within/to the first groove segment 1305 using any known adhesive or fixing technique. Similarly, the second connector apparatus 1405 may be attached within/to the second groove segment 1310 using any known adhesive or fixing technique. The first and second connector apparatuses 1400, 1405 may be fixed in the same manner as one another, or may be fixed using different techniques.

The first connector apparatus 1400 is preferably rigidly attached to the first groove segment 1305, and the second connector apparatus 1405 is preferably rigidly attached to the second groove segment 1310. For example, the first connector apparatus 1400 may be bolted to the bottom surface 1105 and/or side walls of the first groove segment 1305. Similarly, the second connector apparatus 1405 may be bolted to the bottom surface 1105 and/or side walls of the second groove segment 1310. For example, bolts or threaded screws may be used to directly connect the first connector apparatus 1400 to the first groove segment 1305 and/or the second connector apparatus 1405 to the second groove segment 1310. Additionally or alternatively, known fastening components (such as brackets, flanges, etc.) may be utilized to facilitate the attachment of the first connector apparatus 1400 to the first groove segment 1305 and/or the second connector apparatus 1405 to the second groove segment 1310.

Additionally or alternatively, the first and/or second connector apparatuses 1400, 1405 may be adhered to the first and second groove segments 1305, 1310, respectively. For example, an epoxy, resin, or other adhesive agent could be used to adhere the first connector apparatus 1400 and the second connector apparatus 1405 to the bottom surface 1105 and/or side walls of the groove 1300. An adhesive agent may be applied to the first connector apparatus 1400 and then the first connector apparatus 1400 may be placed into the first groove segment 1305 such that the adhesive agent can set. An adhesive agent can be applied to the second connector apparatus 1405 in the same way. Additionally or alternatively, the adhesive agent may be applied directly to the bottom surface 1105 and/or side walls of the first or second groove segment 1305, 1310, and then the first or second connector apparatus 1400, 1405, respectively, may be placed therein to adhere to the groove 1300.

The fastening components (e.g., bolts, screws, brackets, etc.) discussed above could be included in combination with an adhesive agent, or in other embodiments may be omitted when the first and/or second connector apparatuses 1400, 1405 are adhered in the first and second groove segments 1305, 1310, respectively.

Figure 15:
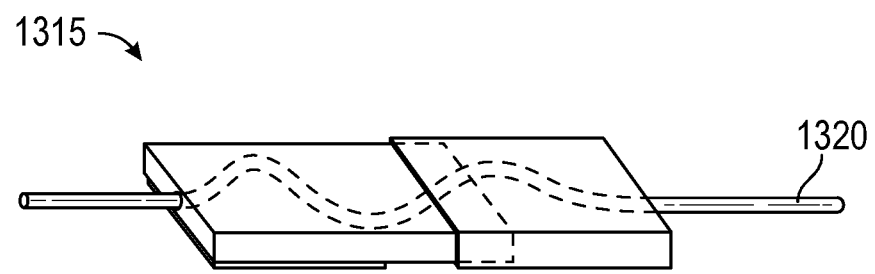
FIG. 15 is a perspective view showing the connection apparatus with a tubular body passing therethrough.

Notably, the first connector apparatus 1400 should typically only be attached to the first groove segment 1305, and the second connector apparatus 1405 should typically only be attached to the second groove segment 1310. This arrangement allows any relative movement between the first groove segment 1305 and the second groove segment 1310 to be compensated by the connection apparatus 1315 to avoid transferring loads to the tubular body 1320 passing through the connection apparatus 1315. FIG. 15 shows a perspective view that may help illustrate this point.

In particular, FIG. 15 shows a perspective view of the first connector apparatus 1400 within the second connector apparatus 1405, and the tubular body 1320 passing therethrough. The first connector apparatus 1400 is movable relative to the second connector apparatus 1405 when the first and second connector apparatuses 1400, 1405 are fixed in the first and second groove segments 1305, 1310, respectively. The first connector apparatus 1400 may possess an exterior dimension that is smaller than the interior dimension of the second connector apparatus 1405 by a tolerance value that allows for relative movement of the first connector apparatus 1400 relative to the second connector apparatus 1405. For example, the first connector apparatus 1400 may have an exterior profile spaced 0.1 to 0.5 inches from the upper and lower inner surfaces of the second connector apparatus 1405 when the first connector apparatus 1400 is partially inserted into the second connector apparatus 1405.

Additionally, the exterior dimension of the first connector apparatus 1400 may be smaller than the interior dimension of the second connector apparatus 1405 by a tolerance value that allows for relative movement of the first connector apparatus 1400 relative to the second connector apparatus 1405 in the horizontal and/or vertical directions. The dimensions are not limited in any respect, however, as a person of ordinary skill in the art will readily understand how to size the profiles of the first and second connector apparatuses 1400, 1405 so that the first connector apparatus 1400 can fit within the second connector apparatus 1405, while allowing some tolerance between the outer and inner surfaces of the connector apparatuses 1400, 1405 to accommodate relative movement.

As shown in FIG. 15, the first connector apparatus 1400 and/or the second connector apparatus 1405 may be a square or rectangular housing. The first connector apparatus 1400 and second connector apparatus 1405 include an interior that is at least partially hollow so that the tubular body 1320 may pass through the first and/or second connector apparatuses 1400, 1405.

The first connector apparatus 1400 and second connector apparatus 1405 are not limited to being formed from any particular material. For example, the first connector apparatus 1400 and/or second connector apparatus 1405 may be metal, such as steel, copper, aluminum, or a metal alloy. The first connector apparatus 1400 and second connector apparatus 1405 are preferably the same material as one another (e.g., to avoid corrosive impacts associated with using different materials), but the first connector apparatus 1400 and second connector apparatus 1405 are not limited to being the same material. In some embodiments, the first connector apparatus 1400 and/or second connector apparatus 1405 may be designed to withstand vehicle loading and/or surface forces.

Figure 16:
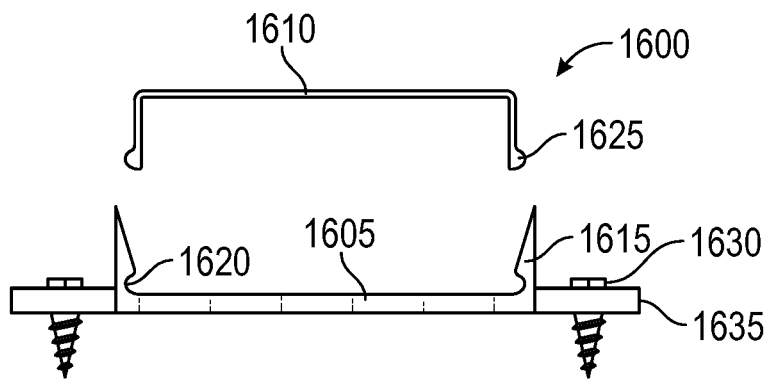
FIG. 16 is a front view of an embodiment of the disclosed connection apparatus.

FIG. 16 illustrates a multi-part connector housing 1600. In some embodiments, the first connector apparatus 1400, the second connector apparatus 1405, or both, can be multi-part connector housings 1600 as show in FIG. 16. This multi-part connector housing 1600 includes a bottom housing portion 1605 and a top housing portion 1610. The top housing portion 1610 is insertable into, and removable from, the bottom housing portion 1605. The bottom housing portion 1605 includes side walls 1615 that extend upwards in a vertical direction from the bottom housing portion 1605. When installed, these side walls 1615 extend vertically upward toward the top surface of the paved surface 1000.

The side walls 1615, in some embodiments, may contain a recess 1620 that is configured to receive a protruding edge 1625 of the top housing portion 1610. In this manner, the top and bottom housing portions 1610, 1605 may fit together in a mechanical manner without using an adhesive agent and instead using, e.g., a press fit. In other embodiments, an adhesive agent, and/or any other fastening means, may be used to connect the top housing portion 1610 to the bottom housing portion 1605. In further embodiments, the top housing portion 1610 and bottom housing portion 1605 may not include the protruding edge 1625 and recess 1620, respectively, and the top and bottom housing portions 1610, 1605 may connect through mechanical and/or adhesive means (e.g., including by applying the protective coating on the tubular body 1320 and onto the multi-part connector housing 1600 such that the protective coating fixes the top and bottom housing portions 1610, 1605 together).

FIG. 16 also shows an example of some of the fasteners and bolts described above. In particular, FIG. 16 shows that the bottom housing portion 1605 can include a bracket or flange 1635 that extends outwards from the bottom housing portion 1605. A fastener 1630, such as a threaded screw or bolt, can be applied through a hole in the bracket or flange 1635 to fix the bottom housing portion 1605 to the bottom surface 1105 of the groove 1300. As explained above, any variations of fasteners, connecting components, and/or adhesives are possible, for example, using adhesives without the bracket or flange 1635 and without the fastener 1630. Additionally or alternatively, the same type of fasteners 1630 and/or flanges 1635 could be arranged to fix the bottom housing portion 1605 to the side walls of the groove 1300.

Figure 17:
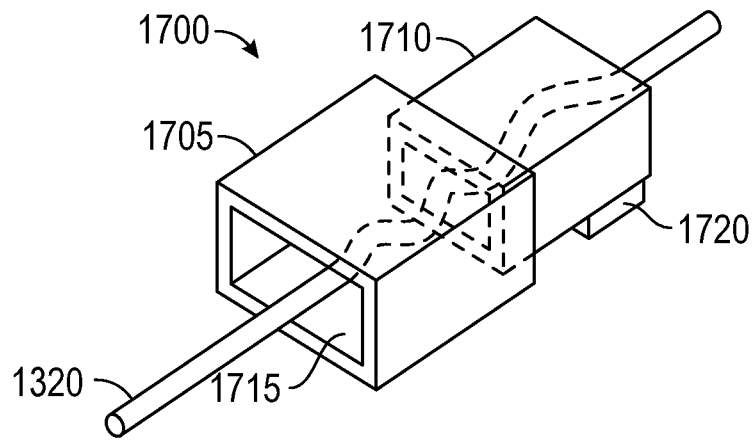
FIG. 17 is perspective view of an embodiment of the disclosed connection apparatus.

FIG. 17 illustrates an embodiment of a connection apparatus 1700 that includes unitary connector housings 1700, 1705. In some embodiments, the first connector apparatus 1400, the second connector apparatus 1405, or both, can be the unitary connector housings 1700, 1705 as show in FIG. 17. In some embodiments, one of the first and second connector apparatuses 1400, 1405 may be a unitary connector housing and the other may be a multi-part connector housing 1600.

The first unitary connector apparatus 1705 of FIG. 17 can be a housing component formed from a single unitary piece, and the second unitary connector apparatus 1710 can be a housing component formed form a single unitary piece. The first unitary connector apparatus 1705 can be a rectangular prism with a hollow interior 1715, and the second unitary connector apparatus 1710 can be a rectangular prism with a hollow interior.

In some embodiments, the second unitary connector apparatus 1710 is smaller than the first unitary connector apparatus 1705 such that second unitary connector apparatus 1710 is configured to move, both vertically and horizontally, relative to the first unitary connector apparatus 1705 when the first and second unitary connector apparatuses 1705, 1710 are installed in the first and second groove segments 1305, 1310, respectively. In other words, the external dimensions of the first unitary connector apparatus 1705 are sized to be larger than the external dimensions of the second unitary connector apparatus 1710, both in the horizontal direction and the vertical direction, so that the second unitary connector apparatus 1710 can be movable relative to the first unitary connector apparatus 1705 when the first and second connector apparatuses 1705, 1710 are fixed in the groove 1300. The particular tolerances between the outermost dimensions of the first and second unitary connector apparatuses 1705, 1710 in both the horizontal and vertical directions may be selected based on the particular application as known to one of ordinary skill in the art.

Because the external dimensions of the second unitary connector apparatus 1710 are smaller than the external dimensions first unitary connector apparatus 1705, the second unitary connector apparatus 1710 may need to be elevated slightly to insert into the first unitary connector apparatus 1705. In some embodiments, the elevation of the second unitary connector apparatus 1710 can be provided by a spacer plate 1720. While the spacer plate 1720 is shown in the example of FIG. 17, the spacer plate 1720 can be used with any of the other embodiments discussed herein, e.g., to align the first and second connector apparatuses 1400, 1405. In addition, multiple spacer plates could be used instead of one spacer plate. Further, in other embodiments, the recess of the second unitary connector apparatus 1710 can be less deep that the recess of the first unitary connector apparatus 1705 such that the second unitary connector apparatus 1710 is located vertically higher than the first unitary connector apparatus 1705, as described further with reference to FIG. 18.

The example shown in FIG. 17 is merely exemplary. For example, the first unitary connector apparatus 1705 may be sized to be smaller than the second unitary connector apparatus 1710 and the spacer plate 1720 in such a scenario would be attached to the first unitary connector apparatus 1705.

Figure 18:
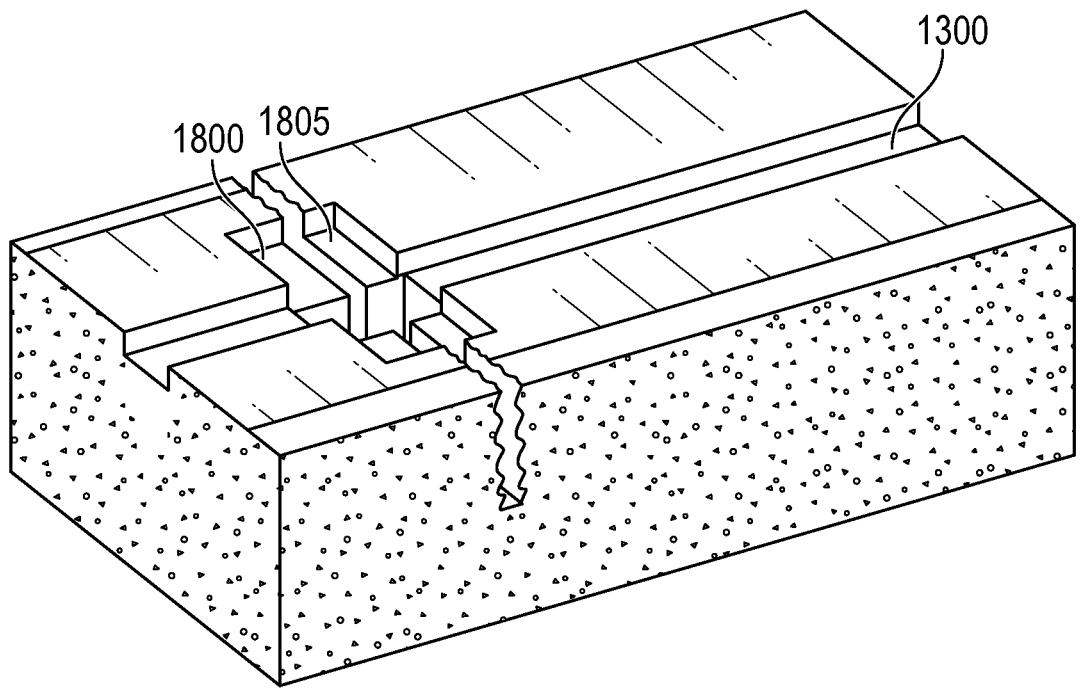
FIG. 18 is a perspective view showing receiving cutouts in the paved surface for receiving the connection apparatus.

FIG. 18 shows an embodiment of forming a first recess 1800 and a second recess 1805 in the paved surface 1000. The first recess 1800 may include two recess portions (one on either side of the crack 1005), and the second recess 1805 may similarly include two recess portions (on either sides of the crack 1005) as shown in FIG. 18.

The first recess 1800 is configured to receive the first connector apparatus 1400, and the second recess 1805 is configured to receive the second connector apparatus 1405. The recesses 1800, 1805 may be formed using any technique with any suitable equipment/tools. For example, a robust saw, such as a circular saw with a diamond blade could be used. The disclosure is not limited in any respect, however, and any type of saw such as an asphalt saw, concrete saw, masonry saw, abrasive saw, other diamond-bladed saws, etc. may be used. For another example, a reciprocating hammer such as a chipping hammer could be employed.

The first and second recesses 1800, 1805 may be wider than the groove 1300 as shown in FIG. 18. The arrangement is not limited in this respect, however, as the first and second recesses 1800 also can be the same width or narrower than the groove 1300. In some embodiments, the first and second recesses 1800, 1805 can each possess dimensions corresponding to the first and second connector apparatuses 1400, 1405, respectively. In these embodiments, the spacer plate 1720 may not be needed. The first recess 1800 may be larger than the second recess 1805 when the first connector apparatus 1400 is larger than the second connector apparatus 1405 (e.g., in embodiments where the second connector apparatus 1405 moves into the interior of the first connector apparatus 1400). Similarly, the first recess 1800 may be smaller than the second recess 1805 when the first connector apparatus 1400 is smaller than the second connector apparatus 1405 (e.g., in embodiments where the first connector apparatus 1400 moves into the interior of the second connector apparatus 1405).

The first recess 1800 may be provided at the same depth as the second recess 1805 from the top surface of the paved surface 1000. A spacer plate 1720 typically would be used in this situation so that the smaller of the first and second connector apparatuses 1400, 1405 elevated slightly to be able to be inserted into the interior of the larger of the two connector apparatuses 1400, 1405.

Alternatively, the first recess 1800 may be provided at a different depth than the second recess 1805. This arrangement might beneficially avoid requiring a spacer plate 1720. For example, in embodiments in which the first connector apparatus 1400 is configured to be inserted into the interior of the second connector apparatus 1405 (i.e., the second connector apparatus 1405 is larger), the first recess 1800 may be slightly less deep than the second recess 1805. The difference in depth between the first recess 1800 and the second recess 1805 can be slightly more than the thickness of the bottom housing portion 1605 of the second connector apparatus 1405 (or the thickness of the bottom wall of the unitary connector housing 1705. The opposite arrangement with the second recess being provided slightly less deep can also be used when the first connector apparatus 1400 is the larger of the two connector apparatuses 1400, 1405.

The first and second recesses 1800, 1805 are preferably provided at a deeper depth than the groove 1300. This beneficially allows the tubular body 1320 to continue on the same plane (i.e., along the bottom surface 1105 of the groove 1300 and then along the bottom surface in the interior of the connection apparatus 1315). A person of ordinary skill in the art will recognize how to determine the dimensions of the recesses based on the dimensions of the first and second connector apparatuses 1400, 1405, including their bottom portions, to minimize the disruption of the tubular body 1320 in the vertical direction when the connection apparatus 1315 is initially installed.

Turning back to FIG. 10, some exemplary explanations of how a tubular body may be deployed on a paved surface are provided below. However, the method of installing the tubular body is not limited to any of these particular configurations, and a person of ordinary skill would understand that various variations and modifications based on, e.g., the condition of the paved surface, the type of project, the type of tubular body, etc. are within the scope of this disclosure.

FIG. 10 shows a crack 1005 in a paved surface 1000. The crack 1005 is a transverse crack extending fully across the paved surface 1000, such that it may not be feasible, or may not be desirable, to simply route the tubular body 1320 deployment around the crack 1005.

A first step for installing the tubular body 1320 across the crack 1005 in the paved surface 1000 may be to provide a groove 1300. The groove 1300 may be a smoothed segment 1100 as shown in FIG. 11. The groove 1300 may also be a trench 1200 (e.g., a microtrench) as shown in FIG. 12.

A next step for installing the tubular body 1320 across the crack 1005 in the paved surface 1000 may be to form the recesses 1800, 1805 in the paved surface 1000 as shown in FIG. 18. Forming the recesses 1800, 1805 may include multiple sub-steps, such as cutting away a portion of the paved surface 1000 using, e.g., a circular saw with a diamond-blade, and thereafter smoothing, sanding, or otherwise preparing the recesses 1800, 1805 to be contoured to match the other profile of the first and second connector apparatus 1400, 1405, respectively.

A next step for installing the tubular body 1320 across the crack 1005 in the paved surface 1000 may be to attach a first connector apparatus 1400 in the first recess 1800 at the first groove segment 1305 in one of the manners explained above or known to a person of skill. In this example, the first connector apparatus 1400 is the larger of the two connector apparatuses 1400, 1405. It is preferable to attach the larger of the two connector apparatuses 1400, 1405 first because the smaller of the two connector apparatuses 1400, 1405 can more easily be attached and inserted into the larger of the two connector apparatuses 1400, 1405 if it is already in place. Nonetheless, the opposite order of attaching the two connector apparatuses 1400, 1405 is also possible.

A next step for installing the tubular body 1320 across the crack 1005 in the paved surface 1000 may be to attach the second connector apparatus 1405 in the second recess 1805 at the second groove segment 1310 in one of the manners explained above or known to a person of skill. As mentioned above, in this example, the second connector apparatus 1405 is the smaller of the two connector apparatuses 1400, 1405. The second connector apparatus 1405 may be inserted into at least a portion of the interior of the first connector apparatus 1400 when it is attached in the second groove segment 1310.

When the first and second connector apparatuses 1400, 1405 are configured similar to the embodiment shown in FIG. 16, it is preferable to first attach only the bottom housing portion 1605 of the first connector apparatus 1400 at the first groove segment 1305 and only the bottom housing portion 1605 of the second connector apparatus 1405 at the second groove segment 1310.

A next step for installing the tubular body 1320 across the crack 1005 in the paved surface 1000 may be to deploy the tubular body 1320 continuously in the first groove segment 1305, through the first and second connector apparatuses 1400, 1405, and in the second groove segment 1310. When the first and second connector apparatuses 1400, 1405 are configured similar to the embodiment shown in FIG. 16, attaching only the bottom housing portions 1605 provides an installation ease and efficiency advantage because the first and second connector apparatuses 1400, 1405 do not have a top portion allowing easy tubular body 1320 deployment.

In some embodiments, the tubular body 1320 may be deployed to have the curved segment 1410 at the region where it passes through the connector apparatuses 1400, 1405. The remaining portions of the tubular body 1320 in the first and second groove segments 1305, 1310 may be linear segments. That is, the deployed tubular body 1320 may possess a complete shape of: linear segment, curved segment, linear segment in the first groove segment 1305, across the connection apparatus 1315, and in the second groove segment 1310, respectively.

When the first and second connector apparatuses 1400, 1405 are configured similar to the embodiment shown in FIG. 16, a next step may be to attach the top housing portions 1610 of the first and second connector apparatuses 1400, 1405. In the particular example discussed here, it may be preferable to first attach the top housing portion 1610 of the second connector apparatus 1405. This may be preferable because the second connector apparatus 1405 is the smaller connector apparatus 1400, 1405 in this example, and thus, the top housing portion 1610 of the first connector apparatus 1400 may thereafter be installed to surround/ enclose the second connector apparatus 1405 at least partially within the interior of the first connector apparatus 1400.

In embodiments where the first and second connector apparatuses 1400, 1405 are configured more similarly to the embodiment shown in FIG. 17 (i.e., as a single, unitary piece), the first and second connector apparatuses 1705, 1710 may be attached in the first and second groove segments 1305, 1310, respectively, and the tubular body 1320 is deployed to pass in the first groove segment 1305, through the interior of the first and second connector apparatuses 1705, 1710, and into the second groove segment 1310. For example, a pushing or pulling means may be utilized to thread the tubular body 1320 through the interior of the attached first and second connector apparatuses 1705, 1710. In still a further variation, the tubular body may be thread through interior of the first and second connector apparatuses 1705, 1710 before the first and second connector apparatuses 1705, 1710 are attached to the first and second groove segments 1305, 1310, respectively.

A final step for installing the tubular body 1320 across the crack 1005 in the paved surface 1000 may be to apply a protective coating onto the tubular body 1320 in the first groove segment 1305 and the second groove segment 1310. This step may include curing the protective coating to harden and/or protectively encase the tubular body 1320 within the protective coating. As mentioned above, the protective coating may also be applied onto the top surface of the connection apparatus 1315. Applying the protective coating to the top surface of the connection apparatus 1315 may provide installation efficiency benefits because a continuous pass of applying the protective coating can be used, and it may also provide robustness benefits to protect the connection apparatus 1315. However, the first and second connector apparatuses 1400, 1405 must be movable relative to one another to some extent, and so in some installations, it may be more preferable to apply the protective coating only to the tubular body 1320 in the first groove segment 1305 and in the second groove segment 1310 (and not to the first or second connector apparatus 1400, 1405).

In some embodiments, the protective coating could be applied to the top surface of only one of the first and second connector apparatuses 1400, 1405 so that the connector apparatus 1400, 1405 that did not receive the coating remains movable relative to the other connector apparatus 1400, 1405. In this way, the second connector apparatus 1405 cannot move because it is held in place by the layer of protective coating, but the first connection apparatus 1400 can move with respect to the second connector apparatus 1405 because it is not held in place by the protective coating. In such an example, it may be preferable to install the larger of the two connector apparatus 1400, 1405 so that its upper surface is at the same level as the paved surface 1000 (i.e., planar to the paved surface) and the smaller of the two connector apparatus 1400, 1405 receives a layer of protective coating that hardens to provide a top surface at the same level as the paved surface 1000.

In a variation of the embodiment described above, the groove 1300 may be entirely omitted and the tubular body may be applied directly to the paved surface 1000, e.g., in the manner described in U.S. Pat. No. 9,588,315. The connection apparatus 1315 could also be applied directly to the paved surface 1000 (e.g., in the event it was sufficiently on the outer periphery of a road and thus would not impact traffic by protruding upward from the surface). More preferably, recesses 1800, 915 could be formed in the paved surface 1000 as described herein and the connection apparatus 1315 could be applied such that it does not extend beyond the top-most layer of any protective coating surrounding the tubular body 1320 on the paved surface 1000.

While examples of tolerances and spacing values between the various components of the apparatus are identified above, the scope of the disclosure should not be understood as limited to any particular tolerances and/or spacings between components. Further, the connection apparatus may include resilient mounting that provides additional robustness, and/or allows for smaller tolerances, to account for movement between the first and second groove segments 1305, 1310. For example, the first and second connector apparatuses/housings may be installed so that they can move to some extent relative to the first and second groove segments 1305, 1310 (e.g., by using any resilient mounting technique or using bolts/screws that are tightened only to a predetermined threshold that allows some movement).

The method and components for attaching the disclosed apparatus at the paved surface is not limited, and variations that would be understood by a person of ordinary skill in the art should be understood as within the scope of this disclosure for all of the various embodiments disclosed herein.

The detailed description above describes a connector apparatus, a system including a connector apparatus, and a method for installing a connector apparatus. The invention is not limited, however, to the precise embodiments and variations described. Various changes, modifications and equivalents can be effected by one skilled in the art without departing from the spirit and scope of the invention as defined in the accompanying claims. It is expressly intended that all such changes, modifications and equivalents which fall within the scope of the claims are embraced by the claims.

What is claimed is:

1. A connector apparatus for housing a tubular body traversing a gap, the connector apparatus comprising:
a first connector housing configured to be fixed to a first surface, the first connector housing comprising a bottom housing that is rigidly connected to the first surface when the first connector housing is fixed to the first surface, the first connector housing further comprising a top housing opposite the bottom housing, an insertion end, and a cable end opposite the insertion end in a horizontal direction, the first connector housing possessing an interior volume defined between the bottom housing, the top housing, the insertion end, and the cable end;
a second connector housing configured to be fixed to a second surface, the second surface being spaced apart from the first surface by a gap, the second connector housing comprising a bottom housing that is rigidly connected to the second surface when the second connector housing is fixed to the second surface, the second connector housing further comprising a top housing opposite the bottom housing, a receiving end, and a cable end opposite the receiving end in the horizontal direction, the second connector housing possessing an interior volume defined between the bottom housing, the top housing, the receiving end, and the cable end;
the insertion end of the first connector housing being smaller than the receiving end of the second connector housing such that the insertion end of the first connector is insertable into the receiving end of the second connector housing; and
the first connector housing being configured to receive the tubular body to pass through the interior volume of the first connector housing and the second connector housing being configured to receive the tubular body to pass through the interior volume of the second connector housing, such that the tubular body traverses continuously through the first connector housing and the second connector housing when the first and second connector housings are fixed to the first and second surfaces.

2. The connector apparatus according to claim 1, wherein the first surface is of a first structural member,
the second surface is of a second structural member, and
the first structural member is distinct from the second structural member.

3. The connector apparatus according to claim 2, wherein the bottom housing at the insertion end of the first connector housing is vertically above the bottom housing at the receiving end of the second connector housing when the first connector housing is fixed the first surface, the second connector housing is fixed to a top surface of the second structural member, and the top surfaces of the first and second structural members are planar.

4. The connector apparatus according to claim 1, wherein the first surface and the second surface are separate portions of a paved surface.

5. The connector apparatus according to claim 1, wherein
the first connector housing is rigidly connected to the first surface via a spacer plate, and
the second connector housing is directly connected to the second surface.

6. The connector apparatus according to claim 1, comprising:
a first fastening bracket configured to fix the first connector housing to the first surface; and
a second fastening bracket configured to fix the second connector housing to the second surface.

7. The connector apparatus according to claim 1, wherein
the top housing of the first connector housing is separable from a remainder of the first connector housing, the top housing of the first connector housing being configured to attach to the remainder of the first connector housing to define the interior volume of the first connector housing; and
the top housing of the second connector housing is separable from a remainder of the second connector housing, the top housing of the second connector housing being configured to attach to the remainder of the second connector housing to define the interior volume of the second connector housing.

8. The connector apparatus according to claim 1, wherein the insertion end of the first connector housing extends over the gap and the second surface in the horizontal direction when the first connector housing is fixed to the first surface and the second connector housing is fixed to the second surface.

9. The connector apparatus according to claim 1, wherein
the cable end of the first connector housing comprises a first tubular body receiving member,
the cable end of the second connector housing comprises a second tubular body receiving member,
the first tubular body receiving member is tapered, and
the second tubular body receiving member is tapered.

10. The connector apparatus according to claim 1, wherein the tubular body is a fiber optic cable, the first and second connector housings being sized to allow the fiber optic cable to pass through the interior volume of the first connector housing and through the interior volume of the second connector housing such that the first and second connector housings provide strain relief to the fiber optic cable only in a horizontal direction.

11. A method comprising:
fixing a first connector housing to a first surface, the first connector housing having an open top portion such that an interior of the first connector housing is exposed;
fixing a second connector housing to a second surface, the second connector housing having an open top portion such that an interior of the second connector housing is exposed, the second surface being spaced apart from the first surface in a horizontal direction by a gap, a portion of the second connector housing traversing the gap and extending over the first connector housing;
applying a tubular body onto the first surface, into the interior of the first connector housing through the open top portion of the first connector housing, into the interior of the second connector housing through the open top portion of the second connector housing, and onto the second surface;
connecting a lid to the second connector housing after the applying of the tubular body to enclose the tubular body in the interior of the second connector housing; and
connecting an other lid to the first connector housing after the connecting of the lid to the second connector housing to enclose the tubular body in the interior of the first connector housing.

12. The method according to claim 11, further comprising:
applying a protective coating onto the tubular body before the connecting of the lid.

13. The method according to claim 11, wherein
the first surface is of a first structural member of a bridge,
the second surface is of a second structural member of the bridge, and
the first structural member is distinct from the second structural member.

14. The method according to claim 11, wherein
the first surface is a portion of a paved road,
the second surface is an other portion of the paved road, and
the gap is a crack in the paved road.

15. The method according to claim 11, wherein
the applying of the tubular body onto the first surface comprises applying the tubular body linearly onto the first surface,
the applying of the tubular body into the interior of the first connector housing through the open top portion of the first connector housing and into the interior of the second connector housing through the open top portion of the second connector housing comprises applying the tubular body non-linearly, and
the applying of the tubular body onto the second surface comprises applying the tubular body linearly onto the second surface.

16. A method for deploying a tubular body on a paved surface across a crack in the paved surface, the method comprising:
forming a groove in the paved surface, the groove extending across the crack in the paved surface such that the groove comprises a first groove segment on one side of the crack and a second groove segment on an other side of the crack;
attaching a first connector apparatus at the first groove segment;
attaching a second connector apparatus at the second groove segment, the second connector apparatus overlapping at least in part the first connector apparatus, at least one of the first connector apparatus and the second connector apparatus extending at least partially across the crack;
deploying the tubular body into the groove such that the tubular body passes continuously in the first groove segment, the first connector apparatus, the second connector apparatus, and the second groove segment; and
applying a protective coating onto the tubular body in the groove.

17. The method according to claim 16, further comprising:
machining a first receiving cutout in the paved surface at an end of the first groove segment immediately adjacent to the crack, the first receiving cutout being wider than the groove; and
machining a second receiving cutout in the paved surface at an end of the second groove segment immediately adjacent to the crack, the second receiving cutout being wider than the groove.

* * * * *